United States Patent
Arimilli et al.

(10) Patent No.: US 9,811,097 B2
(45) Date of Patent: Nov. 7, 2017

(54) ENVIRONMENTAL CONTROL OF LIQUID COOLED ELECTRONICS

(75) Inventors: Ravi K. Arimilli, Austin, TX (US);
Michael J. Ellsworth, Jr., Lagrangeville, NY (US); Edward J. Seminaro, Milton, NY (US)

(73) Assignee: DARPA, Arlington, VA (US)

( * ) Notice: Subject to any disclaimer, the term of this patent is extended or adjusted under 35 U.S.C. 154(b) by 1467 days.

(21) Appl. No.: 12/425,210

(22) Filed: Apr. 16, 2009

(65) Prior Publication Data
US 2010/0263855 A1    Oct. 21, 2010

(51) Int. Cl.
*G05D 23/00*    (2006.01)
*G05D 23/19*    (2006.01)

(52) U.S. Cl.
CPC ............... *G05D 23/1931* (2013.01)

(58) Field of Classification Search
CPC .................................. G05D 23/1931
USPC .......... 165/288, 80.4, 292, 104.33; 62/259.2, 62/185, 201, 332, 333; 361/679.53, 361/679.54, 389, 396, 698, 699, 701, 702; 312/236
See application file for complete search history.

(56) References Cited

U.S. PATENT DOCUMENTS

| | | | |
|---|---|---|---|
| 3,754,596 A | 8/1973 | Ward, Jr. | |
| 5,144,811 A * | 9/1992 | Brodie et al. | 62/176.6 |
| 5,198,962 A | 3/1993 | Tyson | |
| 5,509,468 A * | 4/1996 | Lopez | 165/144 |
| 6,269,650 B1 * | 8/2001 | Shaw | 62/176.6 |

(Continued)

OTHER PUBLICATIONS

Delia et al., "System Cooling Design for the Water-Cooled IBM Enterprise System/900 Processors", IBM Journal of Research and Development, vol. 36, No. 4, pp. 791-803 (Jul. 1992).

(Continued)

*Primary Examiner* — Travis Ruby
(74) *Attorney, Agent, or Firm* — Michael R. Long; William Stock

(57) ABSTRACT

A system and computer program product are provided for controlling liquid-cooled electronics, which includes measuring a first set point temperature, $T_a$, wherein the $T_a$ is based on a dew point temperature, $T_{dp}$ of a computer room. A second set point temperature, $T_b$, is measured, wherein the $T_b$ is based on a facility chilled liquid inlet temperature, $T_{ci}$, and a rack power, $P_{rack}$, of an electronics rack. A Modular Cooling Unit (MCU) set point temperature, $T_{sp}$, is selected. The $T_{sp}$ is the higher value of said $T_a$ and said $T_b$. Responsive to the selected $T_{sp}$, a control valve is regulated. The control valve controls a flow of liquid that passes through a heat exchanger.

13 Claims, 14 Drawing Sheets

(56) References Cited

U.S. PATENT DOCUMENTS

| | | |
|---|---|---|
| 6,349,391 B1 | 2/2002 | Petivan et al. |
| 6,374,627 B1 | 4/2002 | Schumacher et al. |
| 6,494,050 B2 | 12/2002 | Spinazzola et al. |
| 6,587,343 B2 | 7/2003 | Novotny et al. |
| 6,763,880 B1 | 7/2004 | Shih |
| 6,854,284 B2 | 2/2005 | Bash et al. |
| 6,854,287 B2 | 2/2005 | Patel et al. |
| 6,867,970 B2 | 3/2005 | Muller et al. |
| 6,927,980 B2 | 8/2005 | Fukuda et al. |
| 7,002,799 B2 | 2/2006 | Malone et al. |
| 7,011,143 B2 | 3/2006 | Corrado et al. |
| 7,106,590 B2 | 9/2006 | Chu et al. |
| 7,110,260 B2 | 9/2006 | Weber et al. |
| 7,236,363 B2 | 6/2007 | Belady |
| 7,315,448 B1 | 1/2008 | Bash et al. |
| 7,400,505 B2 | 7/2008 | Campbell et al. |
| 7,641,101 B2 | 1/2010 | Campbell et al. |
| 7,757,506 B2 | 7/2010 | Ellsworth, Jr. et al. |
| 2004/0221604 A1 | 11/2004 | Ota et al. |
| 2005/0061541 A1 | 3/2005 | Belady |
| 2006/0002086 A1 | 1/2006 | Teneketges et al. |
| 2006/0090494 A1* | 5/2006 | Manole et al. ............... 62/259.2 |
| 2007/0101334 A1 | 5/2007 | Atyam et al. |
| 2007/0119569 A1 | 5/2007 | Campbell et al. |
| 2007/0213881 A1* | 9/2007 | Belady et al. ................. 700/300 |
| 2007/0227710 A1 | 10/2007 | Belady et al. |
| 2009/0086428 A1 | 4/2009 | Campbell et al. |
| 2009/0086432 A1 | 4/2009 | Campbell et al. |
| 2009/0126909 A1 | 5/2009 | Ellsworth, Jr. et al. |

OTHER PUBLICATIONS

Morgan, "IBM Hints at Triple Redundancy in Power6," Mar. 29, 2006, (http://www.itjungle.com/breaking/bn032906-story01.html).

* cited by examiner

ENVIRONMENTAL CONTROL OF LIQUID COOLED ELECTRONICS

This invention was made with United States Government support under Agreement No. HR0011-07-9-0002 awarded by DARPA. The Government has certain rights in this invention.

CROSS REFERENCE TO RELATED APPLICATIONS

The present application is related to the following United States Patent Applications, which are hereby incorporated by reference in their entirety:
1) U.S. patent application Ser. No. 11/942,207, filed Nov. 19, 2007; and
2) U.S. patent application Ser. No. 12/425,226, filed Apr. 16, 2009.

TECHNICAL FIELD

The present invention relates in general to apparatuses and methods for facilitating greater power efficiency and reliability in the operation of liquid-cooled, rack-mounted assemblages of individual electronics units, such as rack-mounted computer server units.

BACKGROUND OF THE INVENTION

The power dissipation of integrated circuit chips, and the modules containing the chips, continues to increase in order to achieve increases in processor performance. This trend poses a cooling challenge at both module and system level. Increased airflow rates are needed to effectively cool high power modules and to limit the temperature of the air that is exhausted into the computer center.

In many large server applications, processors along with their associated electronics (e.g., memory, disk drives, power supplies, etc.) are packaged in removable drawer configurations stacked within a rack or frame. In other cases, the electronics may be in fixed locations within the rack or frame. Typically, the components are cooled by air moving in parallel airflow paths, usually front-to-back, impelled by one or more air moving devices (e.g., fans or blowers). In some cases it may be possible to handle increased power dissipation within a single drawer by providing greater airflow, through the use of a more powerful air moving device or by increasing the rotational speed (i.e., RPMs) of an existing air moving device. However, this approach is becoming problematic at the rack level in the context of a computer installation (i.e., data center).

The sensible heat load carried by the air exiting the rack is stressing the availability of the computer room air-conditioning to effectively handle the load. This is especially true for large installations with "server farms" or large banks of computer racks close together. In such installations, liquid cooling (e.g., water cooling) is an attractive technology to manage the higher heat fluxes. The liquid absorbs the heat dissipated by the components/modules in an efficient manner. Typically, the heat is ultimately transferred from the liquid to an outside environment, whether air or other liquid coolant.

Power consumption is also another variable that is considered when addressing heat dissipation in an enterprise server installation. In this regard, a data center operator is concerned not only with the electricity costs associated with the operation of the computer electronics, but also with the associated electricity costs to cool the electronics operating within the electronics racks. Such electricity costs include the cost to operate chillers, condensers, pumps, fans, cooling towers, and other related cooling components. Considering that a typical server rack enclosure may require 250 kW of power, one can readily appreciate the amount of heat that can be generated from several tens or hundreds of electronics racks operating in an enterprise server installation.

SUMMARY OF THE INVENTION

The shortcomings of the prior art are overcome and additional advantages are provided through provision of a system for facilitating cooling of electronics. The system includes: an electronics rack having at least one heat-generating electronics subsystem. The system also includes at least one Modular Cooling Unit (MCU) associated with the electronics rack. The MCU is configured to provide system coolant to the at least one heat-generating electronics subsystem for facilitating cooling. Moreover, the system includes at least one heat exchanger, at least one control valve; and at least one system controller. The system controller is coupled to the at least one control valve that controls a flow of liquid that passes through the at least one heat exchanger. The system controller is configured for measuring a first set point temperature, $T_a$, wherein $T_a$ is based on a dew point temperature, $T_{dp}$ of a computer room. The system controller is further configured for measuring a second set point temperature, $T_b$, wherein $T_b$ is based on a facility chilled liquid inlet temperature, $T_{ci}$, and a rack power, $P_{rack}$, of an electronics rack. Moreover, the system controller is configured for selecting a Modular Cooling Unit (MCU) set point temperature, $T_{sp}$, wherein $T_{sp}$ is the higher value of $T_a$ and $T_b$. Responsive to the selected $T_{sp}$, the system controller is configured for regulating a control valve that controls a flow of liquid that passes through a heat exchanger.

In another aspect, a computer program product for controlling liquid-cooled electronics is provided. The computer program product includes a computer-readable medium and program instructions stored on the computer-readable medium that when executed on a processing system, cause the processing system to perform several functions. These functions include measuring a first set point temperature, $T_a$, wherein $T_a$ is based on a dew point temperature, $T_{dp}$ of a computer room. Moreover, a second set point temperature, $T_b$, is measured, wherein the $T_b$ is based on a facility chilled liquid inlet temperature, $T_{ci}$, and a rack power, $P_{rack}$, of an electronics rack. Another function includes selecting a Modular Cooling Unit (MCU) set point temperature, $T_{sp}$. The $T_{sp}$ is the higher value of $T_a$ and $T_b$. Responsive to the selected $T_{sp}$, a control valve is regulated. The control valve controls a flow of liquid that passes through a heat exchanger.

Further, additional features and advantages are realized through the techniques of the present invention. Other embodiments and aspects of the invention are described in detail herein and are considered a part of the claimed invention.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

DETAILED DESCRIPTION OF THE INVENTION

Figure 1:
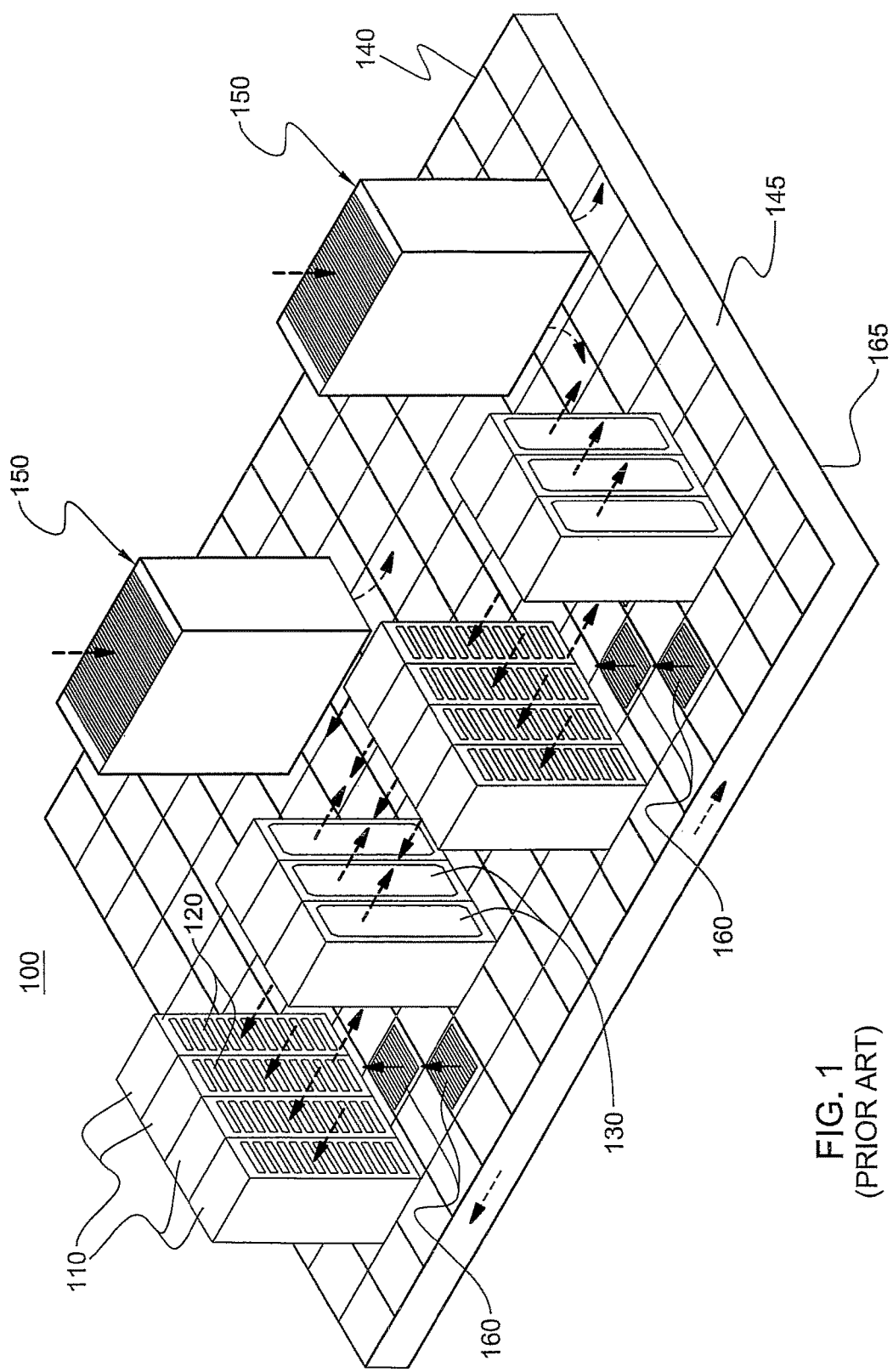
FIG. 1 depicts one embodiment of a conventional raised floor layout of an air-cooled computer installation.

As used herein, the terms "electronics rack," "rack-mounted electronic equipment," and "rack unit" are used interchangeably, and unless otherwise specified include any housing, frame, rack, compartment, blade server system, etc., having one or more heat-generating components of a computer system or electronics system, and may be, for example, a stand alone computer processor having high, mid or low end processing capability. In one embodiment, an electronics rack may comprise multiple electronics subsystems, each having one or more heat-generating components disposed therein requiring cooling. "Electronics subsystem" refers to any sub-housing, blade, book, drawer, node, compartment, etc., having one or more heat-generating electronic components disposed therein. Each electronics subsystem of an electronics rack may be movable or fixed relative to the electronics rack, with the rack-mounted electronics drawers of a multidrawer rack unit and blades of a blade center system being two examples of subsystems of an electronics rack to be cooled.

"Electronic component" refers to any heat-generating electronic component of, for example, a computer system or other electronics unit requiring cooling. By way of example, an electronic component may comprise one or more integrated circuit dies and/or other electronic devices to be cooled, including one or more processor dies, memory dies and memory support dies. As a further example, the electronic component may comprise one or more bare dies or one or more packaged dies disposed on a common carrier. As used herein, "primary heat-generating component" refers to a primary heat-generating electronic component within an electronics subsystem, while "secondary heat-generating component" refers to an electronic component of the electronics subsystem generating less heat than the primary heat-generating component to be cooled. "Primary heat-generating die" refers, for example, to a primary heat-generating die or chip within a heat-generating electronic component comprising primary and secondary heat-generating dies (with a processor die being one example). "Secondary heat-generating die" refers to a die of a multi-die electronic component generating less heat than the primary heat-generating die thereof (with memory dies and memory support dies being examples of secondary dies to be cooled). As one example, a heat-generating electronic component could comprise multiple primary heat-generating bare dies and multiple secondary heat-generating dies on a common carrier. Further, unless otherwise specified herein, the term "liquid-cooled cold plate" refers to any conventional thermally conductive structure having a plurality of channels or passageways formed therein for flowing of liquid coolant there through. In addition, "metallurgically bonded" refers generally herein to two components being welded, brazed or soldered together by any means.

As used herein, "air-to-liquid heat exchange assembly" means any heat exchange mechanism characterized as described herein through which liquid coolant can circulate; and includes, one or more discrete air-to-liquid heat exchangers coupled either in series or in parallel. An air-to-liquid heat exchanger may comprise, for example, one or more coolant flow paths, formed of thermally conductive tubing (such as copper or other tubing) in thermal or mechanical contact with a plurality of air-cooled cooling fins. Size, configuration and construction of the air-to-liquid heat exchange assembly and/or air-to-liquid heat exchanger thereof can vary without departing from the scope of the invention disclosed herein. A "liquid-to-liquid heat exchanger" may comprise, for example, two or more coolant flow paths, formed of thermally conductive tubing (such as copper or other tubing) in thermal or mechanical contact with each other. Size, configuration and construction of the liquid-to-liquid heat exchanger can vary without departing from the scope of the invention disclosed herein. Further, "data center" refers to a computer installation containing one or more electronics racks to be cooled. As a specific example, a data center may include one or more rows of rack-mounted computing units, such as server units.

One example of facility coolant and system coolant is water. However, the concepts disclosed herein are readily adapted to use with other types of coolant on the facility side and/or on the system side. For example, one or more of the coolants may comprise a brine, a fluorocarbon liquid, a liquid metal, or other similar coolant, or refrigerant, while still maintaining the advantages and unique features of the present invention.

Reference is made below to the drawings, which are not drawn to scale for reasons of understanding, wherein the same reference numbers used throughout different figures designate the same or similar components.

As shown in FIG. 1, in a raised floor layout of an air cooled computer installation 100 typical in the prior art, multiple electronics racks 110 are disposed in one or more rows. A computer installation such as depicted in FIG. 1 may house several hundred, or even several thousand microprocessors. In the arrangement of FIG. 1, chilled air enters the computer room via floor vents from a supply air plenum 145 defined between the raised floor 140 and a base or sub-floor 165 of the computer room. Cooled air is taken in through louvered covers at air inlet sides 120 of the electronics racks and expelled through the back (i.e., air outlet sides 130) of the electronics racks. Each electronics rack 110 may have an air moving device (e.g., fan or blower) to provide forced inlet-to-outlet air flow to cool the electronic components within the drawer(s) of the rack. The supply air plenum 145 provides conditioned and cooled air to the air inlet sides of the electronics racks via perforated floor tiles 160 disposed in a "cold" aisle of the computer installation. The conditioned and cooled air is supplied to plenum 145 by one or more conditioned air units 150, also disposed within the computer installation 100. Computer room air is taken into each conditioned air unit 150 near an upper portion thereof. This computer room air comprises in part exhausted air from the "hot" aisles of the computer installation defined by opposing air outlet sides 130 of the electronics racks 110.

Figure 2:
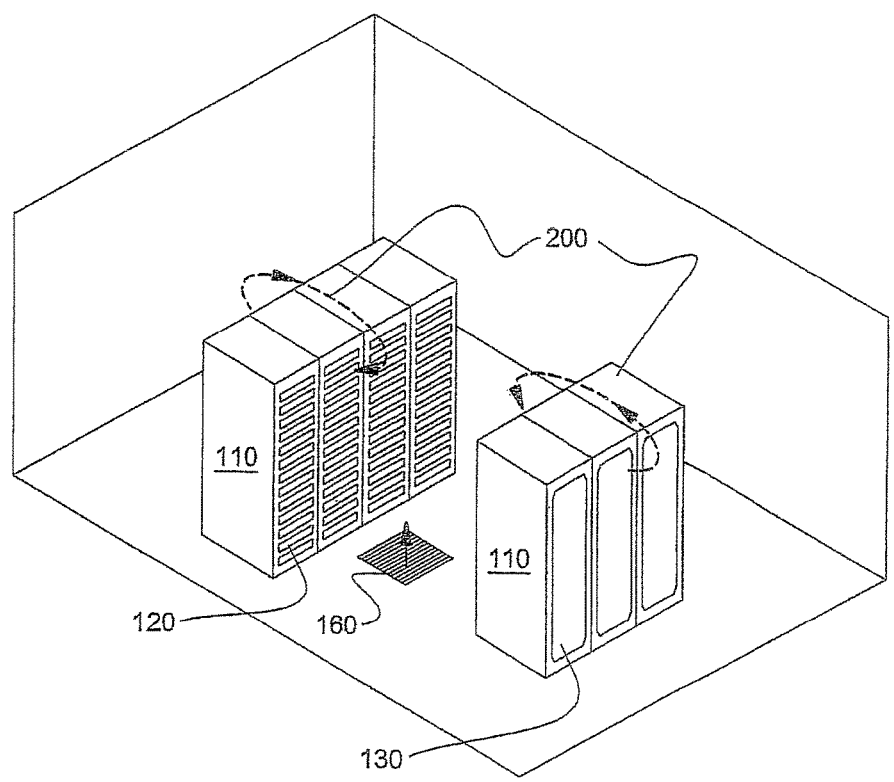
FIG. 2 depicts one problem addressed by the present invention, showing recirculation airflow patterns in one implementation of a raised floor layout of an air-cooled computer installation, in accordance with an aspect of the present invention.

Due to the ever increasing air flow requirements through electronics racks, and limits of air distribution within the typical computer room installation, recirculation problems within the computer room may occur. This is shown in FIG. 2 for a raised floor layout, wherein hot air recirculation 200 occurs from the air outlet sides 130 of the electronics racks back to the cold air aisle defined by the opposing air inlet sides 120 of the electronics rack. This recirculation can occur because the conditioned air supplied through tiles 160 is typically only a fraction of the air flow rate forced through the electronics racks by the air moving devices disposed therein. This can be due, for example, to limitations on the tile sizes (or diffuser flow rates). The remaining fraction of the supply of inlet side air is often made up by ambient computer room air through recirculation 200. This re-circulating flow is often very complex in nature, and can lead to significantly higher rack unit inlet temperatures than might be expected.

The recirculation of hot exhaust air from the hot aisle of the computer room installation to the cold aisle can be detrimental to the performance and reliability of the computer system(s) or electronic system(s) within the racks. Data center equipment is typically designed to operate with rack air inlet temperatures in the 18-35° C. range. For a raised floor layout such as depicted in FIG. 1, however, temperatures can range from 1520° C. at the lower portion of the rack, close to the cooled air input floor vents, to as much as 45-50° C. at the upper portion of the electronics rack, where the hot air can form a self-sustaining recirculation loop. Since the allowable rack heat load is limited by the rack inlet air temperature at the "hot" part, this temperature distribution correlates to a lower processing capacity. Also, computer installation equipment almost always represents a high capital investment to the customer.

Thus, it is of significant importance, from a product reliability and performance view point, and from a customer satisfaction and business perspective, to maintain the temperature of the rack inlet air within an acceptable range to avoid condensation, overheating, and/or power efficiency issues. The efficient cooling of such computer and electronic systems, and the amelioration of localized hot air inlet temperatures to one or more rack units due to recirculation of air currents, are addressed by the apparatuses and methods disclosed herein.

Figure 3:
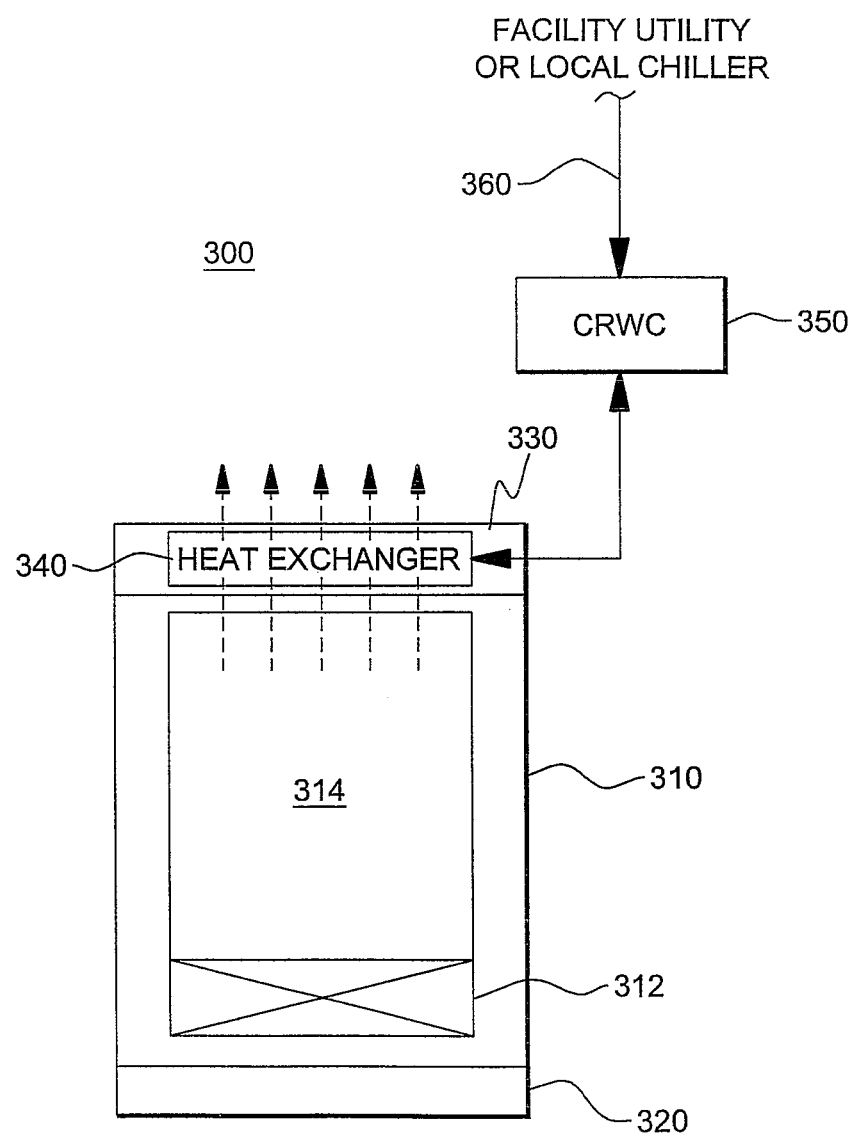
FIG. 3 is a cross-sectional plan view of one embodiment of an electronics rack utilizing at least one air-to-liquid heat exchanger disposed at the air outlet side of the electronics rack, in accordance with an aspect of the present invention.

FIG. 3 depicts one embodiment of a cooled electronics system, generally denoted 300, in accordance with an aspect of the present invention. In this embodiment, electronics system 300 includes an electronics rack 310 having an inlet door cover 320 and an outlet door cover 330 which have openings to allow for the ingress and egress of external air from the inlet side to the outlet side of the electronics rack 310. The system further includes at least one air moving device 312 for moving external air across at least one electronics drawer unit 314 positioned within the electronics rack. Disposed within outlet door cover 330 is a heat exchange assembly 340. Heat exchange assembly 340 includes an air-to-liquid heat exchanger through which the inlet-to-outlet air flow through the electronics rack passes. A computer room water conditioner (CRWC) 350 is used to buffer heat exchange assembly 340 from the building/facility/utility or local chilled coolant 360, which is provided as input to CRWC 350. The CRWC 350 provides system water or system coolant to heat exchange assembly 340. Heat exchange assembly 340 removes heat from the exhausted inlet-to-outlet air flow through the electronics rack for transfer via the system water or coolant to CRWC 350. Advantageously, providing a heat exchange assembly with an air-to-liquid heat exchanger such as disclosed herein at the outlet door cover of one or more electronics racks in a computer installation can significantly reduce heat loads on the current computer room air supply within the computer installation, and facilitating the cooling of computer room air that is recirculated into the rack-mounted electronics units.

Figure 4:
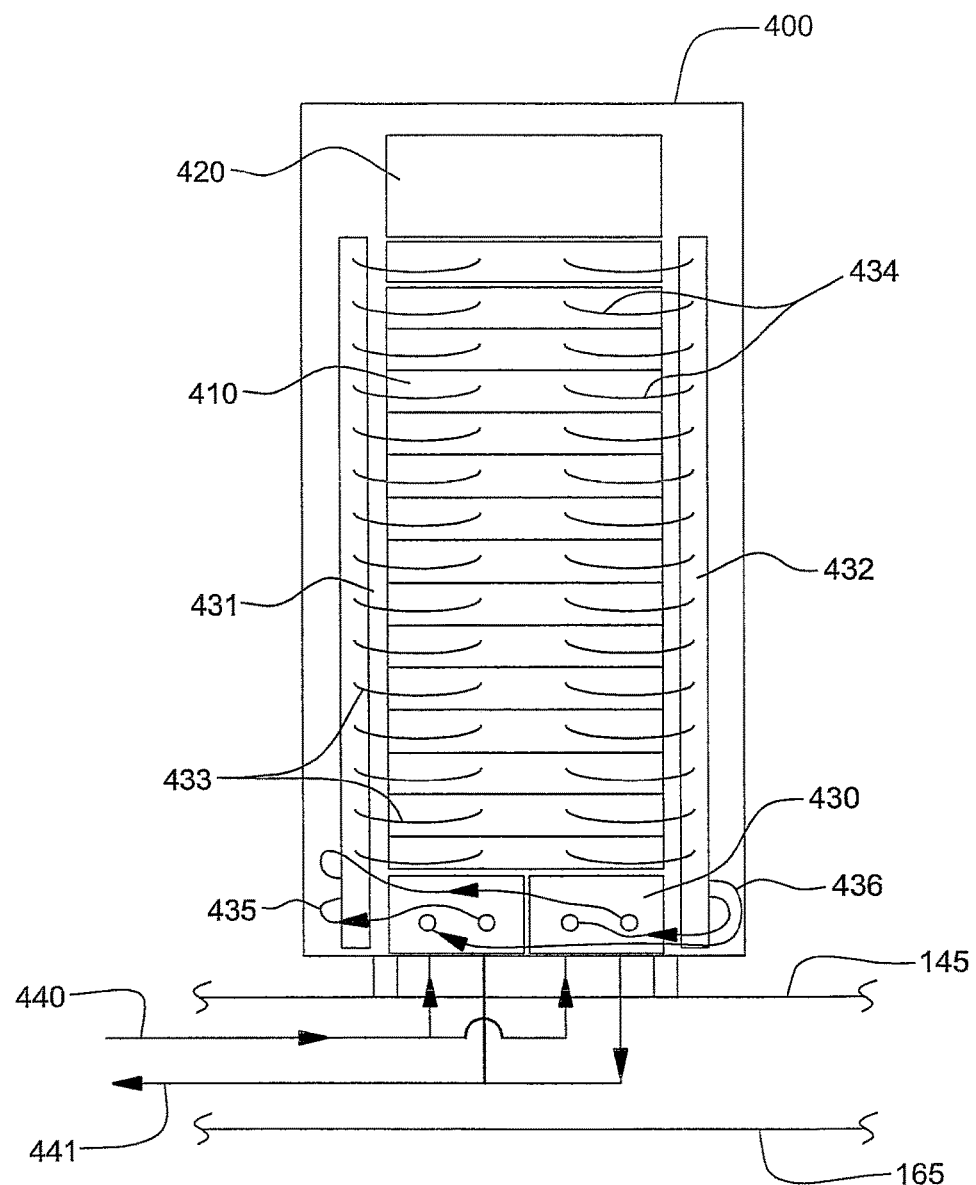
FIG. 4 is a front elevational view of one embodiment of a liquid-cooled electronics rack comprising multiple electronics subsystems cooled by an apparatus, in accordance with an aspect of the present invention.

FIG. 4 depicts one embodiment of a liquid-cooled electronics rack 400 which employs a cooling system to be monitored and operated utilizing the systems and methods described herein. In one embodiment, liquid-cooled electronics rack 400 comprises a plurality of electronics subsystems 410, which are processor or server nodes. A bulk power regulator 420 is shown disposed at an upper portion of liquid-cooled electronics rack 400, and two modular cooling units (MCUs) 430 are disposed in a lower portion of the liquid-cooled electronics rack. In the embodiments described herein, the coolant is assumed to be water or an aqueous-based solution, again, by way of example only.

Typically, server racks will include one or more MCUs which are configured to provide system coolant (i.e., water or other coolant) to the heat-generating electronics subsystem contained in the server rack. Typically, MCUs set the system coolant temperature to a fixed set point temperature, or $T_{sp}$. However, by fixing the set point temperature, MCUs do not take into account other environmental and operating variables, which can permit higher set point temperatures. These variables include computer room air temperature and relative humidity (which when combined, determine room dew point temperature, $T_{dp}$), rack power ($P_{rack}$), and facility chilled water inlet temperature ($T_{ci}$). If these variables were accounted for, greater power efficiency can be gained by raising the set point temperature that is necessary to cool the heat-generating electronics.

Use of higher set point temperatures in a cooling system may also prevent air in or around the system from falling below its liquid saturation point, i.e., its dew point, and condensing. Condensation can damage the electronics equipment in the server rack and result in costly repairs and/or replacements. Allowing for higher set point temperatures may, in certain circumstances, provide benefits both in efficiency and in operations of the system. Efficiency benefits may be obtained because creating condensation requires much more energy than simply cooling air, so that systems creating condensation may use a large amount of electricity or other energy. Thus, the use of higher set point temperatures may result in a cooling system that is operated at a lower operating cost than could otherwise be achieved at a fixed set point temperature.

In addition to MCUs 430, the cooling system includes a system water supply manifold 431, a system water return manifold 432, and manifold-to-node fluid connect hoses 433 coupling system water supply manifold 431 to electronics subsystems 410, and node-to-manifold fluid connect hoses 434 coupling the individual electronics subsystems 410 to system water return manifold 432. Each MCU 430 is in fluid communication with system water supply manifold 431 via a respective system water supply hose 435, and each MWCU 430 is in fluid communication with system water return manifold 432 via a respective system water return hose 436.

As illustrated, heat load of the electronics subsystems is transferred from the system water to cooler facility water supplied by facility water supply line 440 and facility water return line 441 disposed, in the illustrated embodiment, in the space between a raised floor 145 and a base floor 165.

Figure 5:
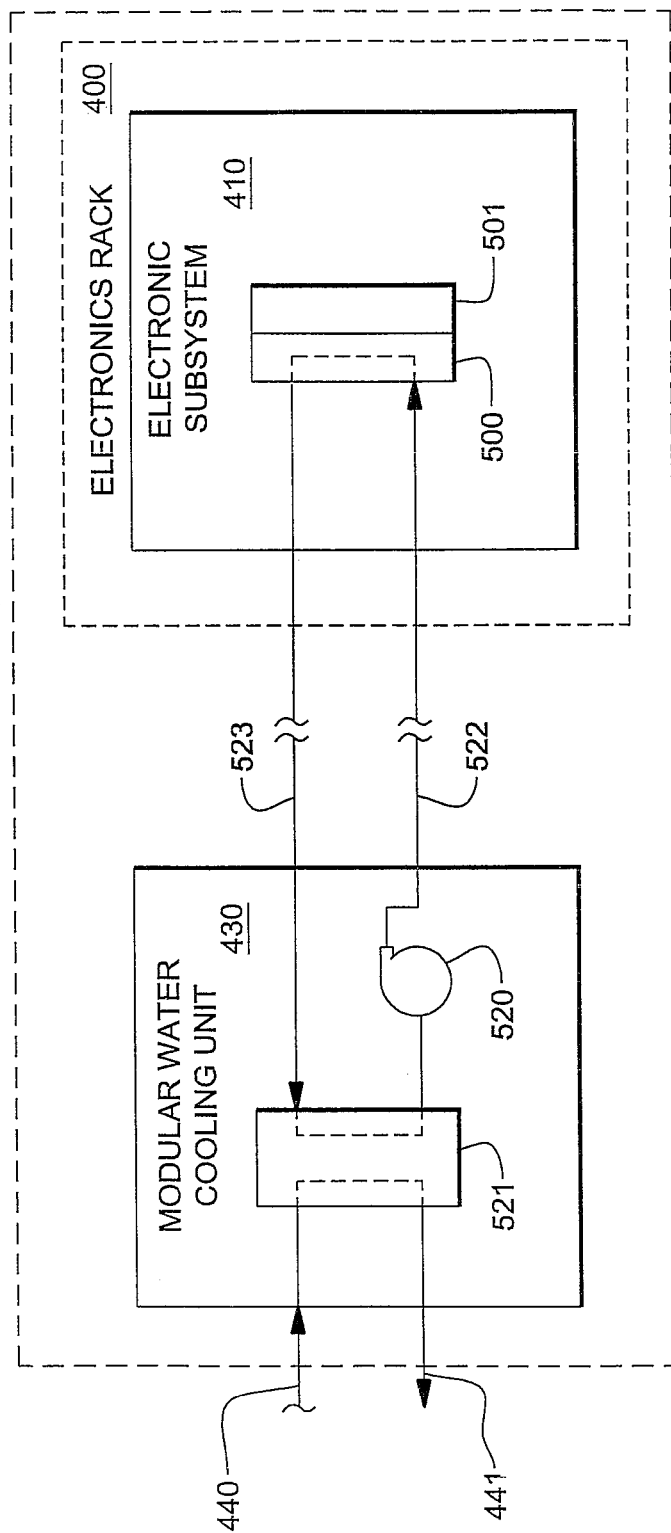
FIG. 5 is a schematic of one embodiment of an electronics subsystem of an electronics rack, wherein an electronics module is liquid-cooled by system coolant provided by one or more modular cooling units disposed within the electronics rack, in accordance with an aspect of the present invention.

FIG. 5 schematically illustrates operation of the cooling system of FIG. 4, wherein a liquid-cooled cold plate 500 is shown coupled to an electronics module 501 of an electronics subsystem 410 within the liquid-cooled electronics rack 400. Heat is removed from electronics module 501 via the system coolant circulated via pump 520 through cold plate 500 within the system coolant loop defined by liquid-to-liquid heat exchanger 521 of modular water cooling unit 430, lines 522, 523 and cold plate 500. The system coolant loop and modular water cooling unit are designed to provide coolant of a controlled temperature and pressure, as well as controlled chemistry and cleanliness to the electronics module(s). Furthermore, the system coolant is physically separate from the less controlled facility coolant in lines 440, 441, to which heat is ultimately transferred.

Figure 6:
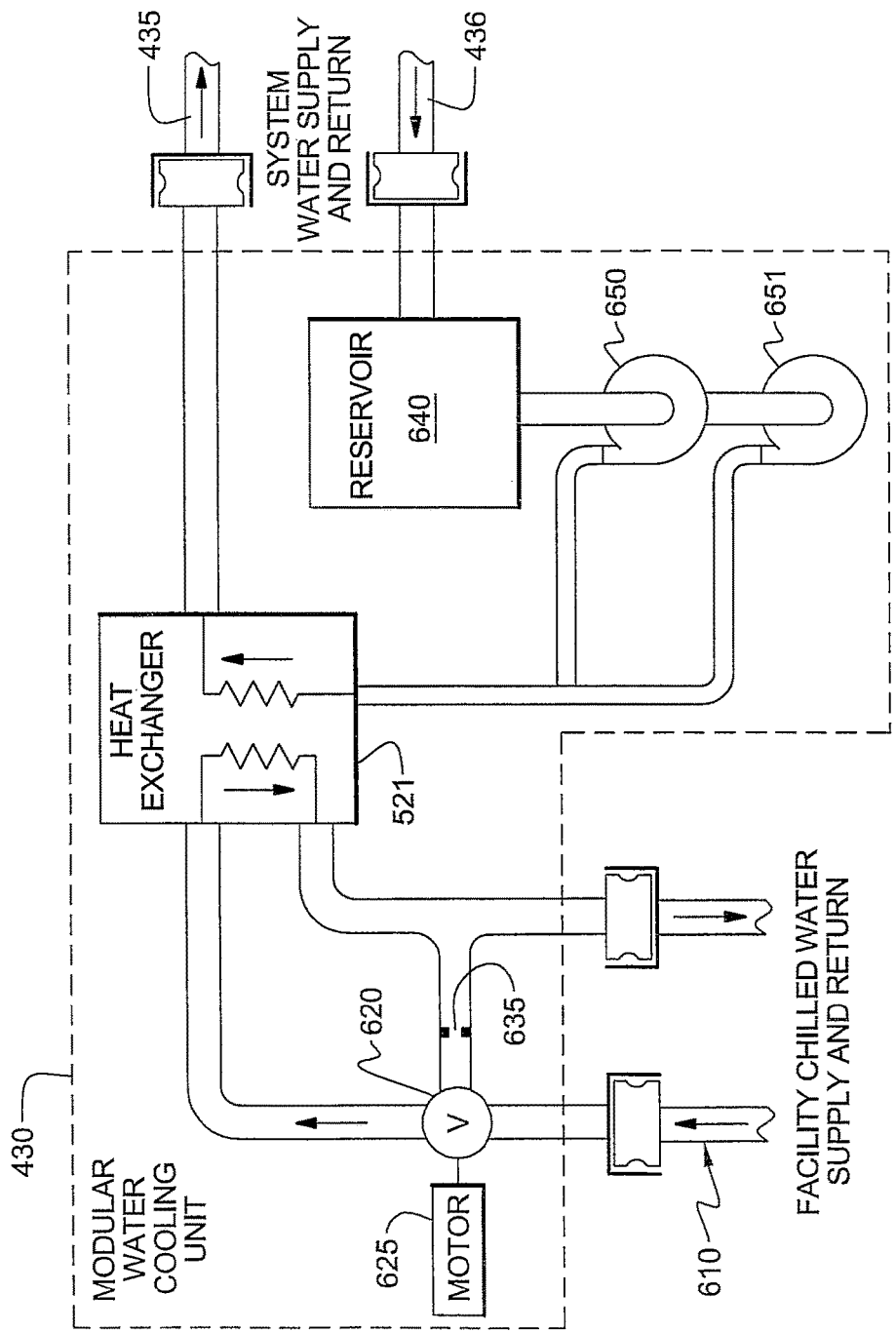
FIG. 6 is a schematic of one embodiment of a modular cooling unit disposed within a liquid-cooled electronics rack, in accordance with an aspect of the present invention.

FIG. 6 depicts a more detailed embodiment of a modular water cooling unit 430, in accordance with an aspect of the present invention. As shown in FIG. 6, modular water cooling unit 430 includes a first cooling loop wherein building chilled, facility coolant is supplied 610 and passes through a control valve 620 driven by a motor 625. Control valve 620 determines an amount of facility coolant to be passed through heat exchanger 521, with a portion of the facility coolant possibly being returned directly via a bypass orifice 635. The modular water cooling unit further includes a second cooling loop with a reservoir tank 640 from which system coolant is pumped, either by pump 650 or pump 651, into the heat exchanger 521 for conditioning and output thereof, as cooled system coolant to the electronics rack to be cooled. The cooled system coolant is supplied to the system water supply manifold and system water return manifold of the liquid-cooled electronics rack via the system water supply hose 435 and system water return hose 436.

Figure 7:
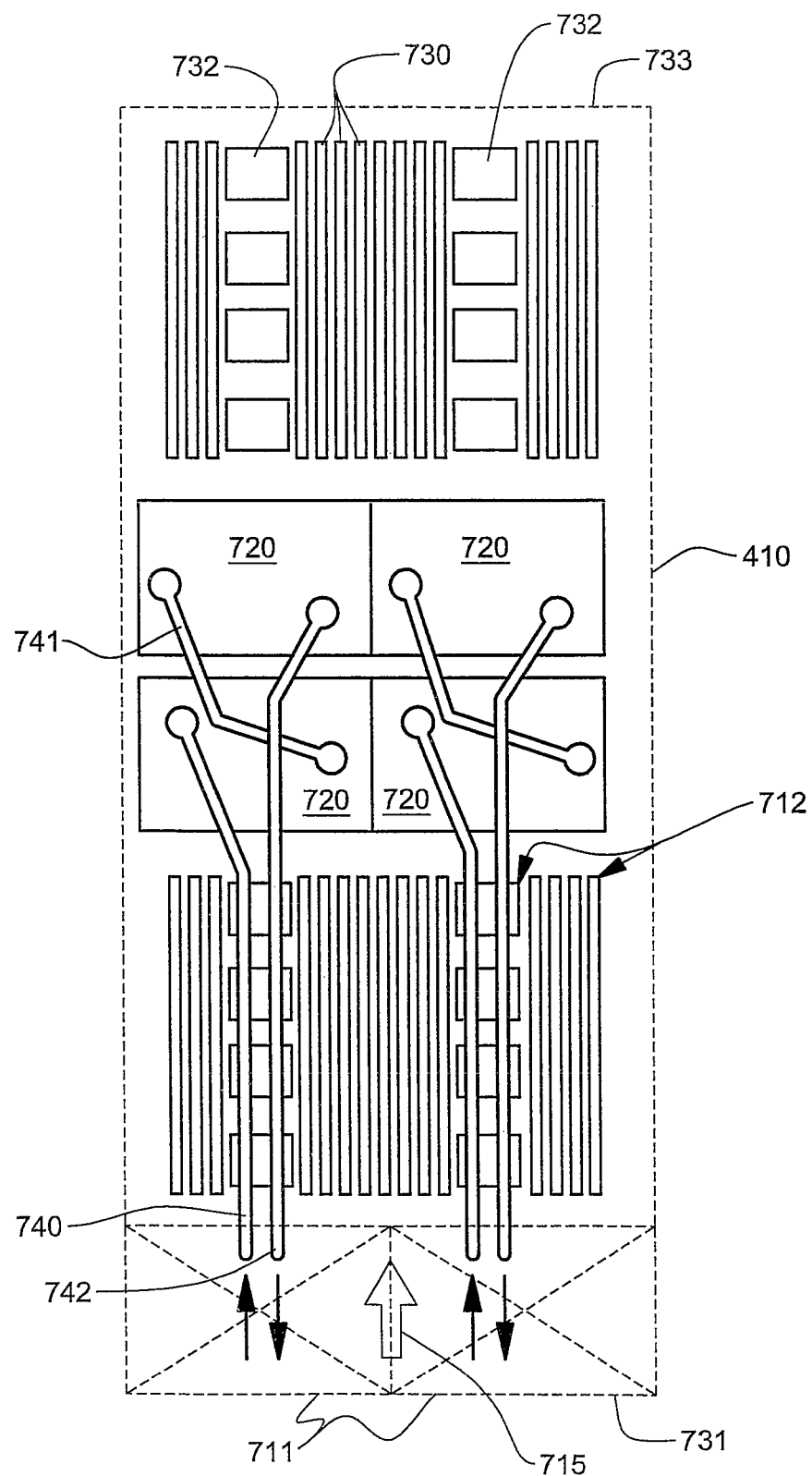
FIG. 7 is a plan view of one embodiment of an electronics subsystem layout illustrating an air and liquid cooling subsystem for cooling components of the electronics subsystem, in accordance with an aspect of the present invention.

FIG. 7 depicts one embodiment of an electronics subsystem 410 component layout wherein one or more air moving devices 711 provide forced air flow 715 to cool multiple components 712 within electronics subsystem 713. Cool air is taken in through a front 731 and exhausted out a back 733 of the drawer. The multiple components to be cooled include multiple processor modules to which liquid-cooled cold plates 720 (of a liquid-based cooling system) are coupled, as well as multiple arrays of memory modules 730 (e.g., dual in-line memory modules (DIMMs)) and multiple rows of memory support modules 732 (e.g., DIMM control modules) to which air-cooled heat sinks are coupled. In the embodiment illustrated, memory modules 730 and the memory support modules 732 are partially arrayed near front 731 of electronics subsystem 410, and partially arrayed near back 733 of electronics subsystem 410. Also, in the embodiment of FIG. 7, memory modules 730 and the memory support modules 732 are cooled by air flow 715 across the electronics subsystem.

The illustrated liquid-based cooling system further includes multiple coolant carrying tubes connected to and in fluid communication with liquid-cooled cold plates 720. The coolant-carrying tubes comprise sets of coolant-carrying tubes, with each set including (for example) a coolant supply tube 740, a bridge tube 741 and a coolant return tube 742. In this example, each set of tubes provides liquid coolant to a series-connected pair of cold plates 720 (coupled to a pair of processor modules). Coolant flows into a first cold plate of each pair via the coolant supply tube 740 and from the first cold plate to a second cold plate of the pair via bridge tube or line 741, which may or may not be thermally conductive. From the second cold plate of the pair, coolant is returned through the respective coolant return tube 742.

Figure 8:
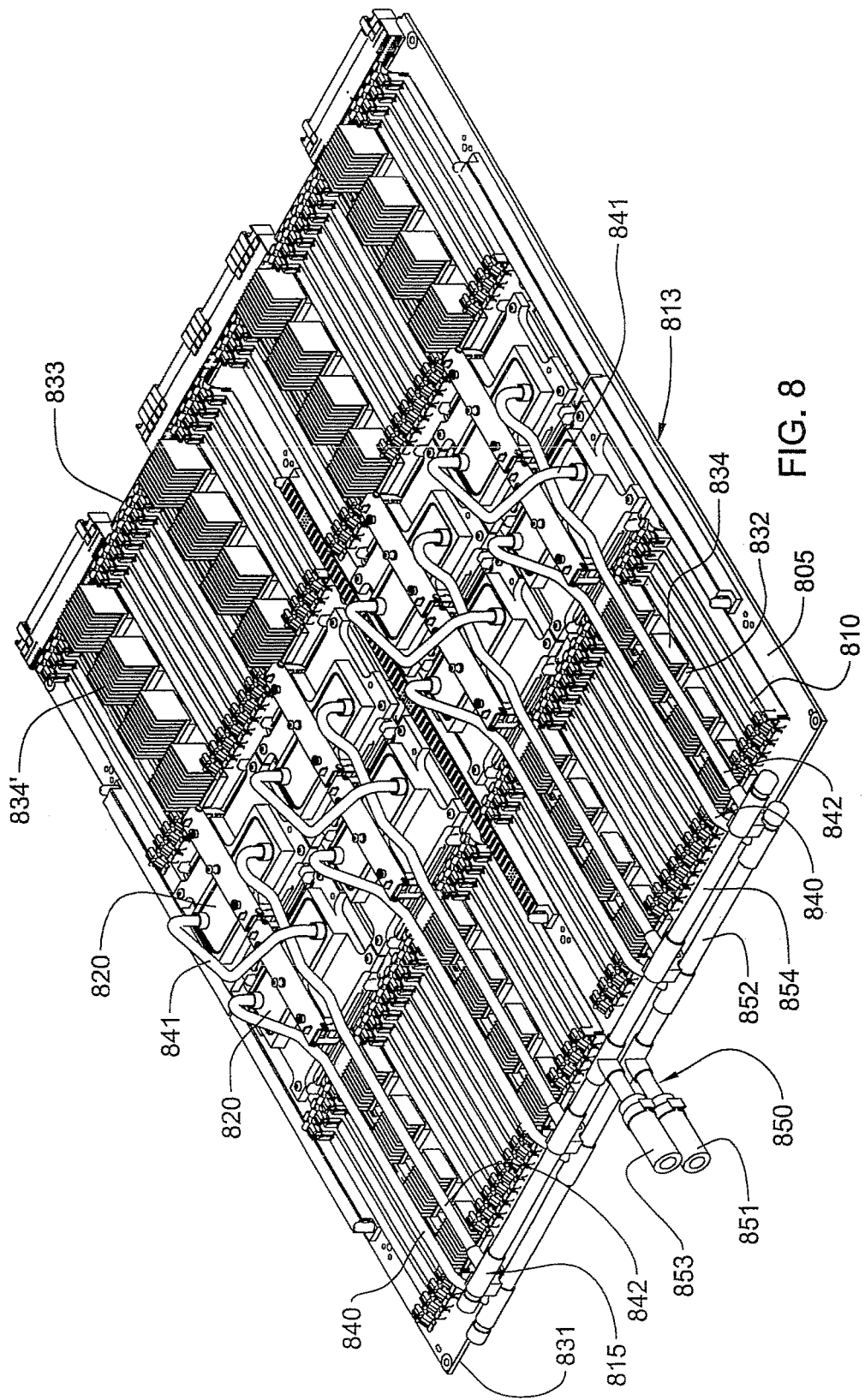
FIG. 8 depicts one detailed embodiment of a partially assembled electronics subsystem layout, wherein the electronics subsystem includes eight heat-generating electronics components to be actively cooled, each having a respective liquid-cooled cold plate of a liquid-based cooling system coupled thereto, in accordance with an aspect of the present invention.

FIG. 8 depicts in greater detail an alternate electronics drawer layout comprising eight processor modules, each having a respective liquid-cooled cold plate of a liquid-based cooling system coupled thereto. The liquid-based cooling system is shown to further include associated coolant-carrying tubes for facilitating passage of liquid coolant through the liquid-cooled cold plates and a header subassembly to facilitate distribution of liquid coolant to and return of liquid coolant from the liquid-cooled cold plates. By way of specific example, the liquid coolant passing through the liquid-based cooling subsystem is chilled water.

As noted, various liquid coolants significantly outperform air in the task of removing heat from heat-generating electronic components of an electronics system, and thereby more effectively maintain the components at a desirable temperature for enhanced reliability and peak performance. As liquid-based cooling systems are designed and deployed, it is advantageous to architect systems which maximize reliability and minimize the potential for leaks while meeting all other mechanical, electrical and chemical requirements of a given electronics system implementation. These more robust cooling systems have unique problems in their assembly and implementation. For example, one assembly solution is to utilize multiple fittings within the electronics system, and use flexible plastic or rubber tubing to connect headers, cold plates, pumps and other components. However, such a solution may not meet a given customer's specifications and need for reliability.

Thus, presented herein in one aspect is a robust and reliable liquid-based cooling system specially preconfigured and prefabricated as a monolithic structure for positioning within a particular electronics drawer.

FIG. 8 is an isometric view of one embodiment of an electronics drawer and monolithic cooling system, in accordance with an aspect of the present invention. The depicted planar server assembly includes a multi-layer printed circuit board to which memory DIMM sockets and various electronic components to be cooled are attached both physically and electrically. In the cooling system depicted, a supply header is provided to distribute liquid coolant from a single inlet to multiple parallel coolant flow paths and a return header collects exhausted coolant from the multiple parallel coolant flow paths into a single outlet. Each parallel coolant flow path includes one or more cold plates in series flow arrangement to cool one or more electronic components to which the cold plates are mechanically and thermally coupled. The number of parallel paths and the number of series-connected liquid-cooled cold plates depends, for example on the desired device temperature, available coolant temperature and coolant flow rate, and the total heat load being dissipated from each electronic component.

More particularly, FIG. 8 depicts a partially assembled electronics system 813 and an assembled liquid-based cooling system 815 coupled to primary heat-generating components (e.g., including processor dies) to be cooled. In this embodiment, the electronics system is configured for (or as) an electronics drawer of an electronics rack, and includes, by way of example, a support substrate or planar board 805, a plurality of memory module sockets 810 (with the memory modules (e.g., dual in-line memory modules) not shown), multiple rows of memory support modules 832 (each having coupled thereto an air-cooled heat sink 834), and multiple processor modules (not shown) disposed below the liquid-cooled cold plates 820 of the liquid-based cooling system 815.

In addition to liquid-cooled cold plates 820, liquid-based cooling system 815 includes multiple coolant-carrying tubes, including coolant supply tubes 840 and coolant return tubes 842 in fluid communication with respective liquid-cooled cold plates 820. The coolant-carrying tubes 840, 842 are also connected to a header (or manifold) subassembly 850 which facilitates distribution of liquid coolant to the coolant supply tubes and return of liquid coolant from the coolant return tubes 842. In this embodiment, the air-cooled heat sinks 834 coupled to memory support modules 832 closer to front 831 of electronics drawer 813 are shorter in height than the air-cooled heat sinks 834' coupled to memory support modules 832 near back 833 of electronics drawer 813. This size difference is to accommodate the coolant-carrying tubes 840, 842 since, in this embodiment, the header subassembly 850 is at the front 831 of the electronics drawer and the multiple liquid-cooled cold plates 820 are in the middle of the drawer.

Liquid-based cooling system 815 comprises a preconfigured monolithic structure which includes multiple (pre-assembled) liquid-cooled cold plates 820 configured and disposed in spaced relation to engage respective heat-generating electronic components. Each liquid-cooled cold plate 820 includes, in this embodiment, a liquid coolant inlet and a liquid coolant outlet, as well as an attachment subassembly (i.e., a cold plate/load arm assembly). Each attachment subassembly is employed to couple its respective liquid-cooled cold plate 820 to the associated electronic component to form the cold plate and electronic component assemblies. Alignment openings (i.e., thru-holes) are provided on the sides of the cold plate to receive alignment pins or positioning dowels during the assembly process. Additionally, connectors (or guide pins) are included within attachment subassembly which facilitate use of the attachment assembly.

As shown in FIG. 8, header subassembly 850 includes two liquid manifolds, i.e., a coolant supply header 852 and a coolant return header 854, which in one embodiment, are coupled together via supporting brackets. In the monolithic cooling structure of FIG. 8, the coolant supply header 852 is metallurgically bonded and in fluid communication to each coolant supply tube 840, while the coolant return header 854 is metallurgically bonded and in fluid communication to each coolant return tube 852. A single coolant inlet 851 and a single coolant outlet 853 extend from the header subassembly for coupling to the electronics rack's coolant supply and return manifolds (not shown).

FIG. 8 also depicts one embodiment of the preconfigured, coolant-carrying tubes. In addition to coolant supply tubes 840 and coolant return tubes 842, bridge tubes or lines 841 are provided for coupling, for example, a liquid coolant outlet of one liquid-cooled cold plate to the liquid coolant inlet of another liquid-cooled cold plate to connect in series fluid flow the cold plates, with the pair of cold plates receiving and returning liquid coolant via a respective set of coolant supply and return tubes. In one embodiment, the coolant supply tubes 840, bridge tubes 841 and coolant return tubes 842 are each preconfigured, semi-rigid tubes formed of a thermally conductive material, such as copper or aluminum, and the tubes are respectively brazed, soldered or welded in a fluid-tight manner to the header subassembly and/or the liquid-cooled cold plates. The tubes are preconfigured for a particular electronics system to facilitate installation of the monolithic structure in engaging relation with the electronics system.

Liquid cooling of heat-generating electronics components within an electronics rack can greatly facilitate removal of heat generated by those components. However, in certain high performance systems, the heat dissipated by certain components being liquid-cooled, such as processors, may exceed the ability of the liquid cooling system to extract heat. For example, a fully configured liquid-cooled electronics rack, such as described hereinabove may dissipate approximately 250 kW of heat. Half of this heat may be removed by liquid coolant using liquid-cooled cold plates such as described above. The other half of the heat may be dissipated by memory, power supplies, etc., which are air-cooled. Given the density at which electronics racks are placed on a data center floor, existing air-conditioning facilities are stressed with such a high air heat load from the electronics rack. Thus, a solution presented herein is to incorporate an air-to-liquid heat exchanger, for example, at the air outlet side of the electronics rack, to extract heat from air egressing from the electronics rack. This solution is presented herein in combination with liquid-cooled cold plate cooling of certain primary heat-generating components within the electronics rack. To provide the necessary amount of coolant, two MCUs are associated with the electronics rack, and system coolant is fed from each MCU to the air-to-liquid heat exchanger in parallel to the flow of system coolant to the liquid-cooled cold plates disposed within the one or more electronics subsystems of the electronics rack. Note that if desired, flow of system coolant to the individual liquid cooled cold plates may be in any one of a multitude of series/parallel arrangements.

Also, for a high availability system, techniques are described herein below for maintaining operation of one modular cooling unit, notwithstanding failure of another modular cooling unit of an electronics rack. This allows continued provision of system coolant to the one or more electronics subsystems of the rack being liquid-cooled. To facilitate liquid cooling of the primary heat-generating electronics components within the electronics rack, one or more isolation valves are employed (upon detection of failure at one MCU of the two MCUs) to shut off coolant flow to the air-to-liquid heat exchanger, and thereby, conserve coolant for the direct cooling of the electronics subsystems. The above-summarized aspects of the invention are described further below with reference to the system and method embodiment of FIGS. 9-13.

In addition, techniques are described herein below for controlling an MCU set point temperature ($T_{sp}$) depending upon other environmental and operational variables, which include dew point temperature ($T_{dp}$), inlet temperature of the facility chilled liquid that enters the MCU ($T_{ci}$), and power required by the electronics rack ($P_{rack}$). The above-summarized aspects of the invention are described further below with reference to the system and method embodiment of FIGS. 9 and 14.

Figure 9:
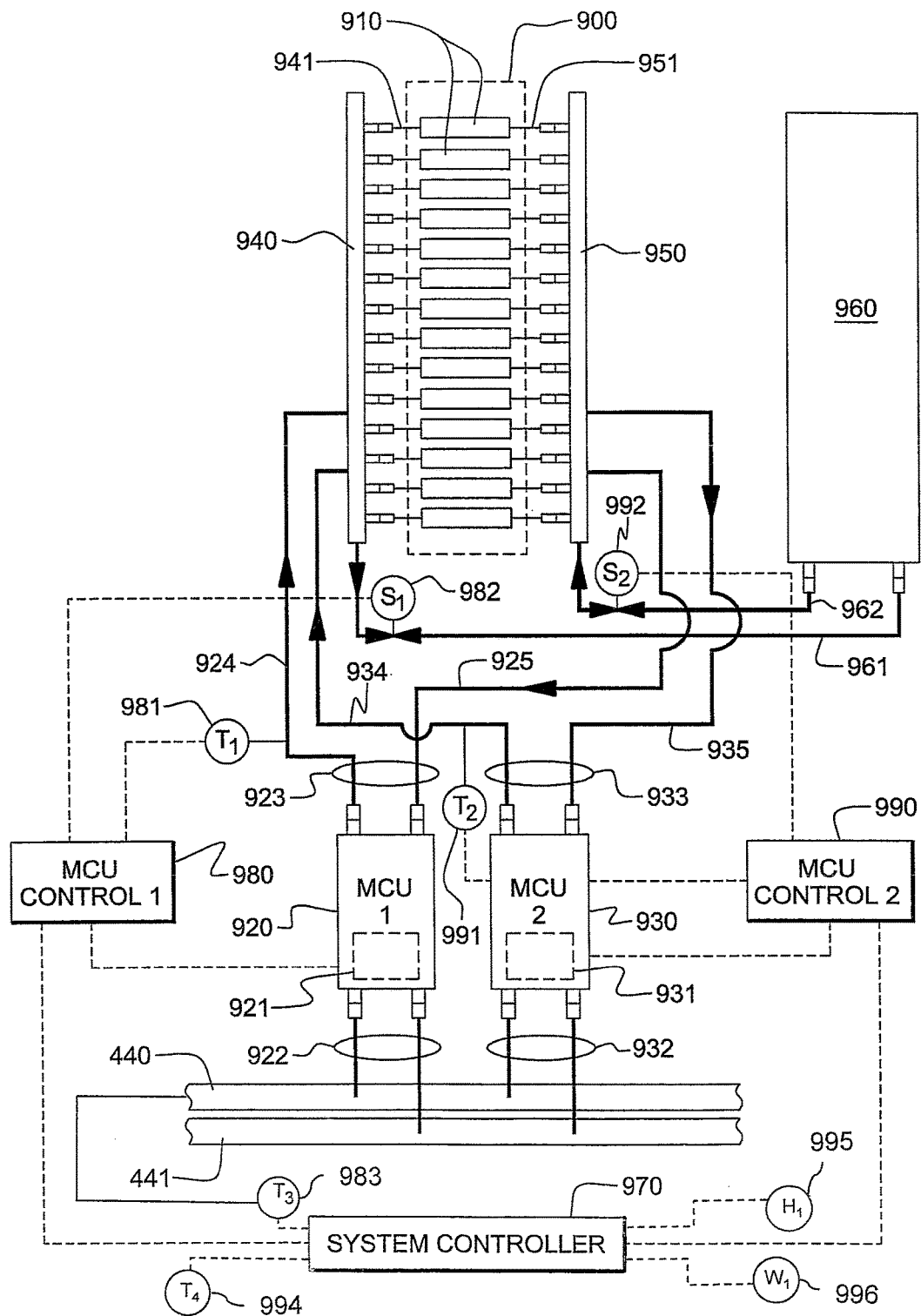
FIG. 9 is a schematic of one embodiment of a system comprising a liquid-cooled electronics rack and a cooling system associated therewith, wherein the cooling system includes two modular cooling units (MCUs) for providing in parallel liquid coolant to the electronics subsystems of the rack, and to an air-to-liquid heat exchanger disposed, for example, at an air outlet side of the electronics rack for cooling air egressing there from, in accordance with an aspect of the present invention.

FIG. 9 illustrates one embodiment of a system wherein an electronics rack 900 includes a plurality of heat-generating electronic subsystems 910, which are liquid-cooled employing a cooling system comprising at least two modular cooling units (MCUs) 920, 930 labeled MCU 1 & MCU 2, respectively. The MCUs are configured and coupled to provide system coolant in parallel to the plurality of heat-generating electronic subsystems for facilitating liquid cooling thereof. Each MCU 920, 930 includes a liquid-to-liquid heat exchanger 921, 931, a first coolant loop 922, 932, and a second coolant loop, 923, 933, respectively. The first coolant loops 922, 932 are coupled to receive chilled coolant, such as facility coolant, via (for example) facility water supply line 440 and facility water return line 441. Each first coolant loop 922, 932 passes at least a portion of the chilled coolant flowing therein through the respective liquid-to-liquid heat exchanger 921, 931. Each second coolant loop 923, 933 provides cooled system coolant to the plurality of heat-generating electronic subsystems 910 of electronics rack 900, and expels heat via the respective liquid-to-liquid heat exchanger 921, 931 from the plurality of heat-generating electronic subsystems 910 to the chilled coolant in the first coolant loop 922, 932.

The second coolant loops 923, 933 include respective coolant supply lines 924, 934, which supply cooled system coolant from the liquid-to-liquid heat exchangers 921, 931 to a system coolant supply manifold 940. System coolant supply manifold 940 is coupled via flexible supply hoses 941 to the plurality of heat-generating electronics subsystems 910 of electronics rack 900 (e.g., using quick connect couplings connected to respective ports of the system coolant supply manifold). Similarly, second coolant loops 923, 933 include system coolant return lines 925, 935 coupling a system coolant return manifold 950 to the respective liquid-to-liquid heat exchangers 921, 931. System coolant is exhausted from the plurality of heat-generating electronics components 910 via flexible return hoses 951 coupling the heat-generating electronics subsystems to system coolant return manifold 950. In one embodiment, the return hoses may couple to respective ports of the system coolant return manifold via quick connect couplings. Further, in one embodiment, the plurality of heat-generating electronics subsystems each include a respective liquid-based cooling subsystem, such as described above in connection with FIGS. 7 & 8, coupled to flexible supply hoses 941 and flexible return hoses 951 to facilitate liquid cooling of one or more heat-generating electronics components disposed within the electronics subsystem.

In addition to supplying and exhausting system coolant in parallel to the plurality of heat-generating electronics subsystems of the electronics rack, the MCUs 920, 930 also provide in parallel system coolant to an air-to-liquid heat exchanger 960 disposed, for example, for cooling air passing through the electronics rack from an air inlet side to an air outlet side thereof. By way of example, air-to-liquid heat exchanger 960 is a rear door heat exchanger disposed at the air outlet side of electronics rack 900. Further, in one example, air-to-liquid heat exchanger 960 is sized to cool substantially all air egressing from electronics rack 900, and thereby reduce air-conditioning requirements for a data center containing the electronics rack. In one example, a plurality of electronics racks in the data center are each provided with a cooling system such as described herein and depicted in FIG. 9.

In the embodiment of FIG. 9, system coolant flows to and from air-to-liquid heat exchanger 960 via a coolant supply line 961 coupling system coolant supply manifold 940 to air-to-liquid heat exchanger 960, and a coolant return line 962 coupling the air-to-liquid heat exchanger to system coolant return manifold 950. Quick connect couplings may be employed at the inlet and outlet of air-to-liquid heat exchanger 960 and/or at corresponding ports at the system coolant supply and return manifolds to facilitate connection of coolant supply and return lines 961, 962. In one embodiment, it is assumed that one MCU of the two MCUs illustrated is incapable of being sized to function within required design parameters as a primary MCU (with the other MCU being a backup MCU) to extract the full heat load from both the plurality of heat-generating electronics subsystems and the air-to-liquid heat exchanger. Therefore, the two MCUs 920, 930 are assumed in normal operation to be functioning in parallel. This also ensures a measure of redundancy to the cooling system.

As shown, the cooling system further includes a system controller 970, and an MCU control 1 980 and an MCU control 2 990, which cooperate together to monitor system coolant temperature of each MCU, and automatically isolate air-to-liquid heat exchanger 960 upon detection of failure of one MCU (as well as to ensure shut down of a failing MCU) so as not to degrade cooling capability of the system coolant provided by the remaining operational MCU to the electronics subsystems of the rack. In one embodiment, the MCU control 1 and the MCU control 2 are control cards, each associated with a respective MCU.

As shown, system controller 970 is coupled to both MCU control 1 and the MCU control 2. MCU control 1 980 is coupled to a temperature sensor $T_1$ 981, which is disposed to sense system coolant temperature within system coolant supply line 924, for example, near a coolant outlet of liquid-to-liquid heat exchanger 921 within MCU 1 920. Additionally, MCU control 1 980 is coupled to a solenoid-actuated isolation valve 982, which in the embodiment depicted, is disposed within coolant supply line 961 coupling in fluid communication system coolant supply manifold 940 to air-to-liquid heat exchanger 960. Similarly, MCU control 2 990 couples to MCU 2 930, as well as to a second temperature sensor $T_2$ 991, disposed for sensing system coolant temperature within system coolant supply line 934, and to a second isolation valve $S_2$ 992, which in the example depicted, is coupled to coolant return line 962 coupling air-to-liquid heat exchanger 960 to coolant supply return manifold 950. System controller 970 is coupled to a third temperature sensor $T_3$ 983 disposed for sensing facility chilled liquid inlet temperature ($T_{ci}$). In addition, system controller 970 is coupled to a fourth temperature sensor $T_4$ 994 for sensing the computer room's air temperature, a hygrometer, $H_1$ 995 for sensing the relative humidity in the computer room, and a wattmeter $W_1$ 996 for sensing the electrical power consumed by the rack. System controller 970 includes a processor and computer-readable storage memory for storing processor-executable instructions associated with the control of MCU set point temperature ($T_{sp}$), as described in FIG. 14. System controller 970 is electrically coupled to control valve 620 (FIG. 6).

FIGS. 10-13 are flowcharts which illustrate processing implemented by system controller 970, MCU control 1 980 and MCU control 2 990. Table 1 describes variables used in the example flowcharts of FIGS. 10-13, as well as possible values and initial conditions for each variable when the cooling system is operating normally.

TABLE 1

| Variable | Description | Value = 1 | Value = 0 | Initial Condition |
|---|---|---|---|---|
| TS | Temperature within specification? | In specification | Out of specification | 1 |
| ST | MCU ON or OFF? | ON | OFF | 1 |
| SV | Isolation valve open or closed? | Open | Closed | 1 |
| FS | Has MCU been shut down? | Has been shut down | Has not been shut down | 0 |
| FV | Has isolation valve been closed? | Has been closed | Has not been closed | 0 |

The variables are further qualified in FIGS. 10-13 with the number "1" or the number "2", representative of whether the variable applies to the first or second temperature sensor, first or second MCU, or first or second isolation valve.

In the below discussion, although described with reference to processing within system controller 970 (FIG. 9) and MCU control 1 card 980 and MCU control 2 card 990, one skilled in the art will understand that the processing described herein could readily be implemented by a single controller coupled to each temperature sensor, isolation valve and MCU. In the illustrated embodiment, FIGS. 10 & 12 depict processing implemented within system controller 970, while FIG. 11 describes processing of MCU control 1 980 and FIG. 13 processing of MCU control 2 990 (by way of example only).

Figure 10:
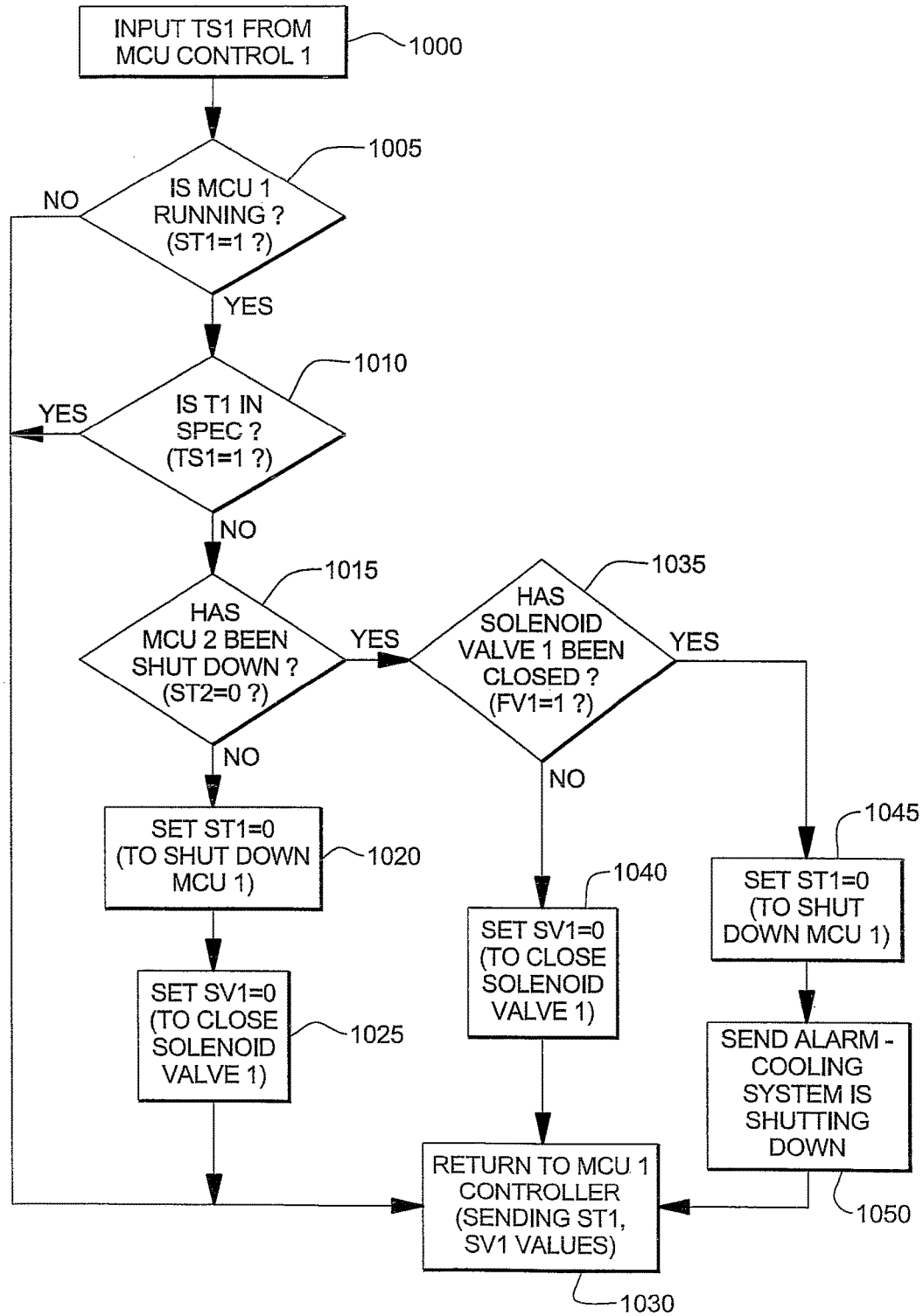
FIG. 10 is a flowchart of one embodiment of processing implemented by the system controller of FIG. 9 for facilitating detection of a failure at MCU 1, and responsive thereto, shutting off of MCU 1 and shutting off flow of coolant to the air-to-liquid heat exchanger, in accordance with an aspect of the present invention.

Beginning with FIG. 10, the system controller receives as input variable TS 1 from MCU control 1 1000, which indicates whether system coolant being output from MCU 1 is within specification (i.e., within a defined range). The system controller initially determines whether MCU 1 is running (that is, whether the variable ST1=1) 1005. If "no", then processing returns to MCU control 1 1030 with the system controller sending current ST1 and SV 1 values back to MCU control 1.

Assuming that MCU 1 is running, then the system controller determines whether the temperature sensed at temperature sensor T1 is within specification (i.e., whether TS 1=1) 1010. If "yes", processing returns to MCU control 1 1030. Assuming that system coolant temperature sensed by temperature sensor T1 is out of specification, then the system controller determines whether MCU 2 has been shut down (i.e., ST2=0?) 1015. If "no", then the variable ST1 is set to zero to indicate that MCU 1 should be shut down 1020, and the variable SV1 is set to zero to direct closing of isolation valve $S_1$ 1025. These new values are returned to MCU control 1 1030, which acts on the new values as described herein below.

Assuming that MCU 2 has been shut down, then processing inquires whether isolation valve $S_1$ has been closed (FV1=1?) 1035. If "no", then the variable SV1 is set to zero to instruct closing of isolation valve $S_1$ 1040, after which processing returns to MCU control 1 with the new SV1 value to effectuate closing of isolation valve $S_1$. If isolation valve $S_1$ has been closed, then the system controller sets the variable ST1 equal to zero to shut down MCU 1 1045 and issues an alarm (e.g., to a data center operator) indicating that the cooling system for the associated electronics rack is shutting down 1050, after which processing returns to MCU control 1 to effectuate the MCU 1 shut down.

Figure 11:
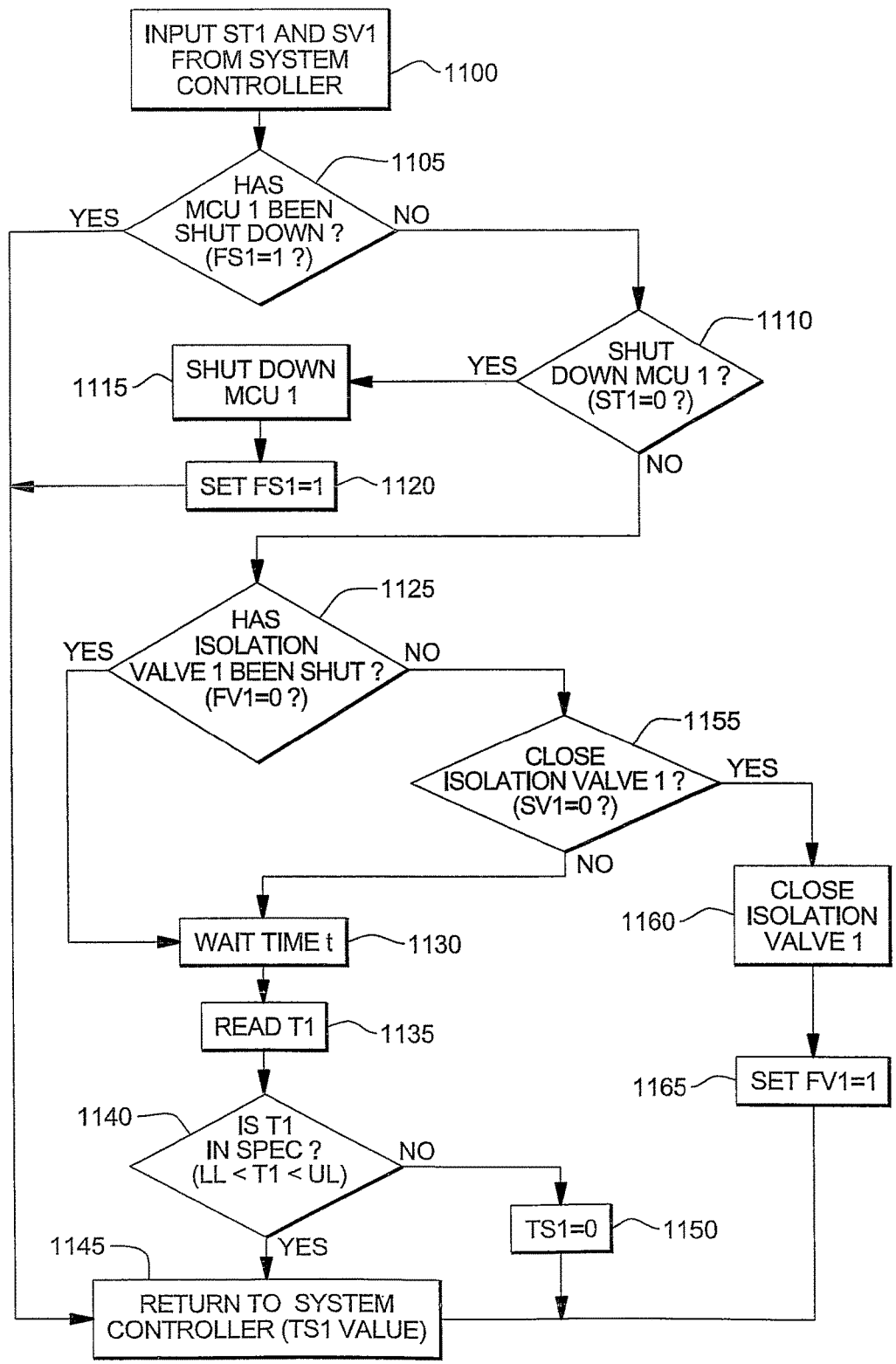
FIG. 11 is a flowchart of one embodiment of processing implemented by the MCU control 1 of FIG. 9, which facilitates monitoring of system coolant temperature, shut down of MCU 1 upon detection of a failure thereof, and shut off of isolation valve 1, in accordance with an aspect of the present invention.
Figure 12:
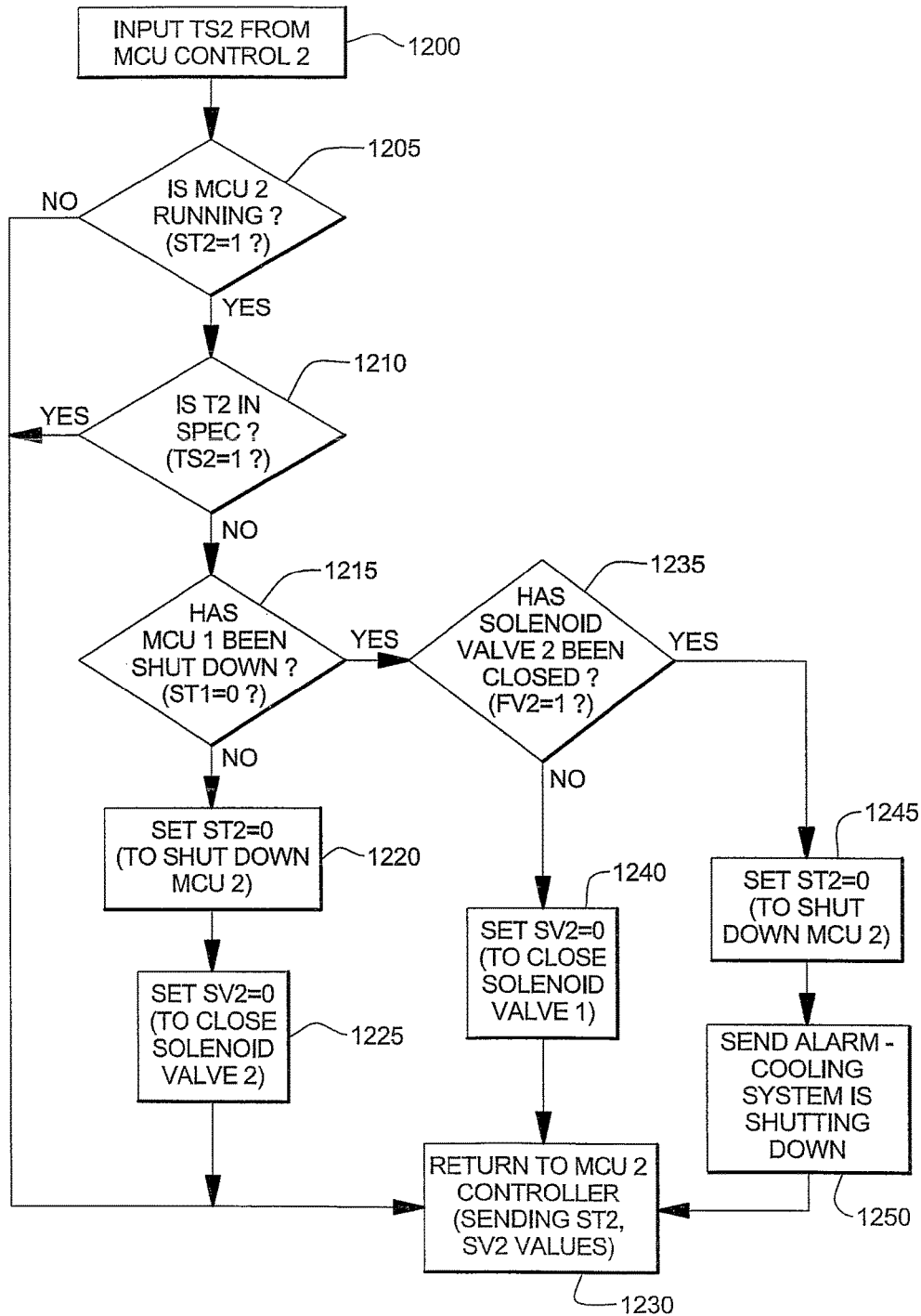
FIG. 12 is a flowchart of one embodiment of processing implemented by the system controller of FIG. 9 for facilitating detection of a failure at MCU 2, and responsive thereto, shutting off of MCU 2 and shutting off flow of coolant through the air-to-liquid heat exchanger, in accordance with an aspect of the present invention.

As noted, FIG. 11 depicts one embodiment of processing implemented by MCU control 1 980 (FIG. 9). MCU control 1 receives as input the variables ST1 and SV1 from the system controller 1100, and initially determines whether MCU 1 has been shut down (FS1=1?) 1105. If "yes", then processing returns to the system controller 1145. If "no", then processing determines whether MCU 1 is to be shut down (ST1=0?) 1110. If "yes", MCU control 1 shuts down MCU 1 1115 and sets the variable FS1 equal to 1 1120, indicating that MCU 1 has been shut down, after which processing returns to the system controller 1145.

Assuming that MCU 1 is not to be shut down, then processing determines whether isolation valve $S_1$ has been shut (FV 1=0?) 1125. If "yes", processing waits time t 1130 before reading temperature sensor T1 1135. By way of example, time t might be 15-30 seconds in operation. Processing then determines whether the value of temperature sensor $T_1$ is within specification (e.g., is $T_1$ greater than a predefined acceptable lower limit (LL), and less than a predefined acceptable upper limit (UL)?) 1140. If "no", then the variable TS 1 is set to zero to indicate that system coolant temperature is out of specification 1150 and processing returns to system controller 1145. From inquiry 1125, if isolation valve $S_1$ has not been shut, processing determines whether isolation valve $S_1$ is to be closed 1155. If "no", processing waits time t, and then proceeds as described above. Otherwise, MCU control 1 closes isolation valve $S_1$ 1160 and sets the variable FV 1 equal to 1 1165, and returns processing control to system controller 1145.

As noted, FIG. 12 depicts system controller processing with respect to MCU control 2. As described above in connection with FIG. 10, the system controller receives as input variable TS2 from MCU control 2 1200, which indicates whether second system coolant temperature is within specification (i.e., within a defined range). The system controller initially determines whether MCU 2 is running (ST2=1?) 1205. If "no", then processing returns to MCU control 2 1230, with the system controller sending current ST2 and SV2 values back to MCU control 2.

Assuming that MCU 2 is running, then the system controller determines whether the temperature sensed at temperature sensor $T_2$ is within specification (TS2=1) 1210. If "yes", processing returns to MCU control 2 1230. Assuming that system coolant temperature sensed by temperature sensor $T_2$ is out of specification, then the system controller determines whether MCU 2 has been shut down (ST2=0?) 1215. If "no", then the variable ST2 is set to zero to indicate that MCU 2 should be shut down 1220, and the variable SV2 is set to zero to direct closing of isolation valve $S_2$ 1225. These new values are returned to MCU control 2 1230, which acts on the new values as described below.

Assuming that MCU 2 has been shut down, then processing inquires whether isolation valve $S_2$ has been closed (FV2=1?) 1235. If "no", then the variable SV2 is set to zero to instruct closing of isolation valve $S_2$ 1240, after which processing returns to MCU control 2 with the new SV 2 value to effectuate closing of isolation valve $S_2$. If isolation valve $S_2$ has been closed, then the system controller sets the variable ST2 equal to zero to shut down MCU 2 1245 and issues an alarm (e.g., to a data center operator), indicating that the cooling system for the associated electronics rack is shutting down 1250, after which processing returns to MCU control 2 to effectuate the MCU 2 shut down.

Figure 13:
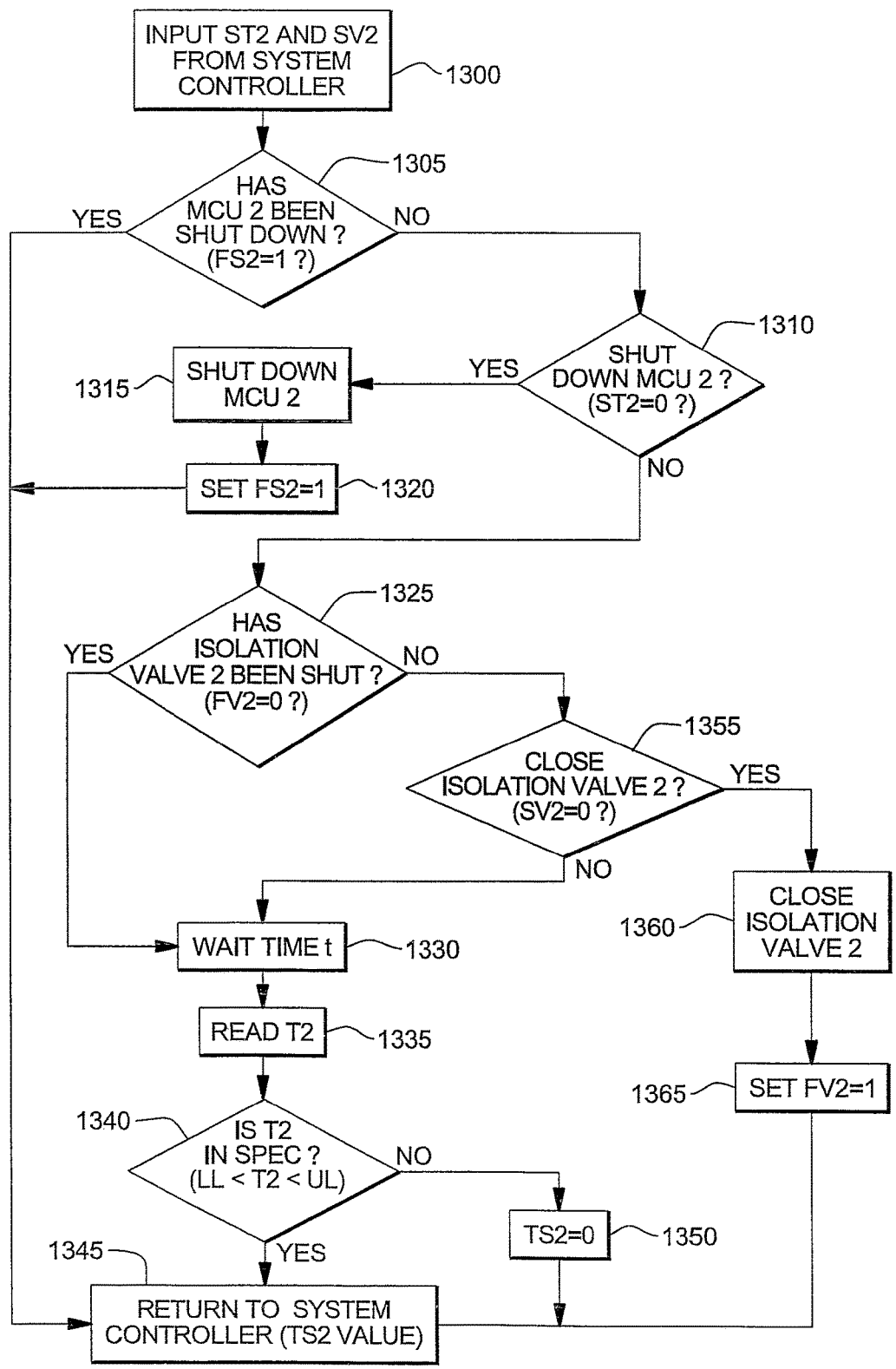
FIG. 13 is a flowchart of one embodiment of processing implemented by the MCU control 2 of FIG. 9, which facilitates monitoring of system coolant temperature, shut down of MCU 2 upon detection of a failure thereof, and shut off of isolation valve 2, in accordance with an aspect of the present invention.

FIG. 13 depicts one embodiment of processing implemented by MCU control 2. MCU control 2 receives as input the variables ST2 and SV2 from the system controller 1300, and initially determines whether MCU 2 has been shut down (i.e., FS 2=1?) 1305. If "yes", then processing returns to the system controller 1345. If "no", then processing determines whether MCU 2 is to be shut down (ST2=0?) 1310. If "yes", MCU control 2 shuts down MCU 2 1315 and sets the variable FS2 equal to 1 1320, indicating that MCU 2 has been shut down, after which processing returns to the system controller 1345.

Assuming that MCU 1 is not to be shut down, then processing determines whether isolation valve $S_2$ has been shut (FV2=0?) 1325. If "yes", processing waits time t 1330 before reading temperature sensor T2 1335. By way of example, time t might be 15-30 seconds in operation. Processing then determines whether the value of temperature sensor T2 is within specification (e.g., is T2 greater than predefined acceptable lower limit (LL), and less than predefined acceptable upper limit (UL)?) 1340. If "no", then the variable TS2 is set to zero to indicate that system coolant temperature is out of specification 1150 and processing returns to system controller 1345. From inquiry 1325, if isolation valve $S_2$ has not been shut, processing determines whether isolation valve $S_1$ is to be closed 1355. If "no", processing waits time t, and proceeds as described above. Otherwise, MCU control 2 closes isolation valve $S_2$ 1360 and sets the variable FV2 equal to 1 1365 and returns processing control to system controller 1345.

Figure 14:
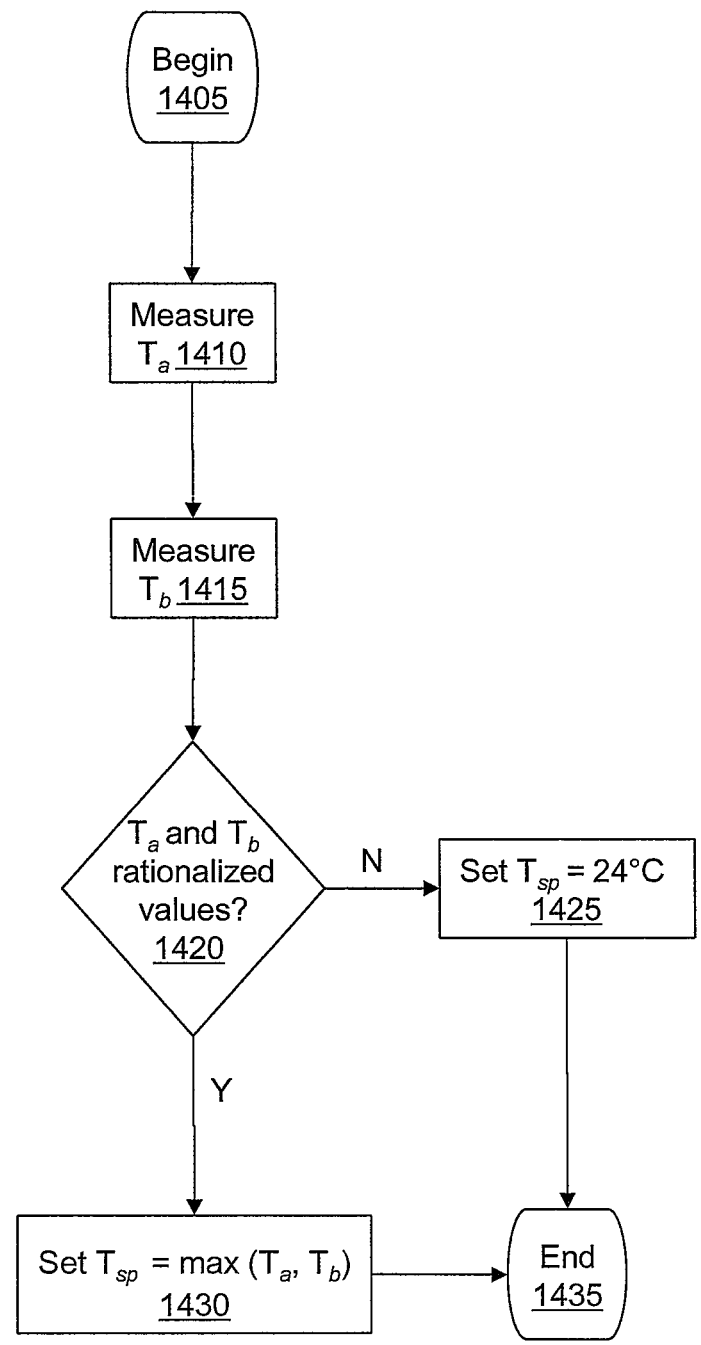
FIG. 14 is a flowchart of one embodiment of processing implemented by the system controller 970 of FIG. 9, which facilitates control of a MCU set point temperature, $T_{sp}$, in accordance with an aspect of the present invention.

Turning now to FIG. 14 a method is illustrated for controlling the MCU set point temperature, $T_{sp}$. The method is implemented by system controller 970. The method begins at block 1405 and proceeds to block 1410, where a first set point temperature, $T_a$, is measured. The value of the first set point temperature is based on the measured dew point temperature, $T_{dp}$, values of the computer room. System controller 970 measures $T_{dp}$ using the measured values from fourth temperature sensor $T_4$ 994 and hygrometer $H_1$ 995. According to an embodiment of the invention, the value of $T_a$ varies depending upon the measured dew point temperature, $T_{dp}$. For example, if $T_{dp}$ is less than 12° C., then $T_a$ is set to 15° C. However, if $T_{dp}$ is greater than or equal to 12° C., then $T_a$ is equal to the measured $T_{dp}$ plus 3° C. If the value of $T_{dp}$ is not rationalized (i.e., the value cannot be obtained, inaccurate, or unreliable), the value of $T_a$ is set to a default value of 24° C.

From block 1410, the method continues to block 1415, where a second set point temperature, $T_b$, is measured. The value of the second set point temperature is based on the facility chilled liquid inlet temperature, $T_{ci}$ (as measured by $T_3$ 983) and the rack power, $P_{rack}$ (as measured by $W_1$ 996). According to one embodiment, the expression which relates $T_b$, $T_{ci}$, $P_{rack}$ is as follows: $T_b = T_{ci} + (0.000032 * P_{rack} + 1.4° C.)$. If the value of $T_{ci}$ is not rationalized, the value of $T_b$ is set to a default value of 24° C. Moreover, if the value of $P_{rack}$ is not rationalized and the value of $T_{ci}$ is rationalized, then the value of $T_b$ is equal to $T_{ci} + 8° C$.

From block 1415, the method continues to decision block 1420, where it is determined whether the values of $T_a$ and/or $T_b$ are rationalized values. If it is determined in decision block 1420 that either $T_a$ or $T_b$ are not rationalized values, then the method proceeds to block 1425 which depicts system controller 970 setting a default value for $T_{sp}$ (e.g., 24° C.). From block 1425, the method ends at termination block 1435. However, if it is determined in decision block 1420 that $T_a$ and $T_b$ are rationalized values, then the method proceeds to block 1430 which depicts system controller 970 selecting the higher value among $T_a$ and $T_b$ as the MCU set point temperature $T_{sp}$. By selecting the higher value, the MCU can operate with greater power efficiency since the liquid coolant does not have to be cooled to a lower temperature, while at the same time ensuring that the MCU setpoint temperature does not fall below the current dew point temperature, $T_{dp}$. The method ends at termination block 1435.

Those skilled in the art will note from the above description that various aspects of the coolant control valve operations and protocol depicted in the figures may be automated by provision of an appropriate controller disposed, for example, within the coolant servicing apparatus, and the use of solenoid-operated control valves coupled to the controller. Moreover, according to one embodiment of the invention, system controller 970 can direct the reduction in the number of revolutions per minute (RPM) of a liquid inlet pump of an MCU in response to a reduction in MCU set point temperature, $T_{sp}$. Conversely, system controller 970 can direct an increase in the number of revolutions per minute (RPM) of a liquid inlet pump of an MCU in response to an increase in $T_{sp}$.

In the flow charts above, one or more of the methods and/or processes are embodied in a computer-readable storage medium including computer readable code such that a series of steps are performed when the computer readable code is executed by a processor. In one or more implementations, certain processes of the methods and/or processes are combined, performed simultaneously, concurrently (e.g., scheduled quickly enough in time to appear simultaneous to a person), or in a different order, or perhaps omitted, without deviating from the spirit and scope of the invention. Thus, while the method(s) and/or process(es) are described and illustrated in a particular sequence, use of a specific sequence of processes is not meant to imply any limitations on the invention. Changes may be made with regards to the sequence of processes without departing from the spirit or scope of the present invention. Use of a particular sequence is therefore, not to be taken in a limiting sense, and the scope of the present invention extends to the appended claims and equivalents thereof.

As will be appreciated by one skilled in the art, the present invention may be embodied as a method, process, system, and/or computer program product. Accordingly, the present invention may take the form of an entirely hardware embodiment, a software embodiment (including firmware, resident software, micro-code, etc.) or an embodiment combining software and hardware aspects that may all generally be referred to herein as a "circuit," "module," "logic," and/or "system." Furthermore, the present invention may take the form of an article of manufacture having a computer program product with a computer-usable storage medium having computer-executable program instructions/code embodied in or on the medium.

As will be further appreciated, the method(s) and/or process(es) in embodiments of the present invention may be implemented using any combination of software, firmware, microcode, and/or hardware. As a preparatory step to practicing the invention in software, the programming code (whether software or firmware) will typically be stored in one or more machine readable storage mediums such as fixed (hard) drives, diskettes, magnetic disks, optical disks, magnetic tape, semiconductor memories such as RAMs, ROMs, PROMs, EPROMs, EEPROMs, etc., thereby making an article of manufacture, in one or more embodiments. The storage medium may be electronic, magnetic, optical, electromagnetic, infrared, or semiconductor system (or apparatus or device). Further, the storage medium may be any apparatus that may store the program for use by or in connection with the execution system, apparatus, or device. The method(s) and/or process(es) disclosed herein may be practiced by combining one or more machine-readable storage devices including the code/logic according to the described embodiment(s) with appropriate processing hardware to execute and/or implement the code/logic included therein. In general, the term computer, computer system, or data processing system can be broadly defined to encompass any device having a processor (or processing unit) which executes instructions/code from a memory medium.

While the invention has been described with reference to exemplary embodiments, it will be understood by those skilled in the art that various changes may be made and equivalents may be substituted for elements thereof without departing from the scope of the invention. In addition, modifications may be made to adapt a particular system, device or component thereof to the teachings of the invention without departing from the essential scope thereof. Therefore, it is intended that the invention not be limited to the particular embodiments disclosed for carrying out this invention, but that the invention will include all embodiments falling within the scope of the appended claims. Moreover, use of the terms first, second, etc. can denote an order if specified, or the terms first, second, etc. can be used to distinguish one element from another without an ordered imposed.

What is claimed is:

1. A system for controlling liquid-cooled electronics, said system comprising:
   an electronics rack including at least one heat-generating electronics subsystem;
   at least one Modular Cooling Unit (MCU) associated with said electronics rack and configured to provide system coolant to said at least one heat-generating electronics subsystem for facilitating cooling thereof, wherein each MCU includes a liquid-to-liquid heat exchanger, a first coolant loop and a second coolant loop, and shares an air-to-liquid heat exchanger; and
   a system controller coupled to at least one control valve that controls a flow of system coolant that passes through said liquid-to-liquid heat exchanger and coupled to at least one isolation valve that further controls a flow of the system coolant through the air-to-liquid heat exchanger, wherein said system controller is configured to:
   determine a first set point temperature, $T_a$, wherein said $T_a$ is based on a dew point temperature, $T_{dp}$, of a computer room;
   determine a second set point temperature, $T_b$, wherein said $T_b$ is based on a facility chilled liquid inlet temperature, $T_{ci}$, and a rack power, $P_{rack}$, of an electronics rack;
   select a MCU set point temperature, $T_{sp}$, for the MCU such that power efficiency of the system is increased while ensuring that said $T_{sp}$ does not fall below said $T_{dp}$, wherein said $T_{sp}$ is selected to be the higher value of said $T_a$ and said $T_b$;
   regulate said control valve responsive to said selected $T_{sp}$; and
   in response to determining that a temperature of the system coolant is out of specification, control the isolation valve to shut off the flow of the system coolant to the air-to-liquid heat exchanger.

2. The system of claim 1, wherein said controller is further configured to select a default value of said $T_{sp}$, in response to determining said $T_a$ and said $T_b$ are not rationalized.

3. The system of claim 2, wherein said controller is further configured to select said default value for $T_a$ in response to determining said $T_{dp}$ is not rationalized.

4. The system of claim 2, wherein said controller is further configured to select said default value for $T_b$ in response to determining said $T_{ci}$ is not rationalized.

5. The system of claim 1, wherein said $T_a$ is set to a first temperature constant of 15 degrees Celsius if $T_{dp}$ is less than a threshold temperature of 12 degrees Celsius, and wherein said $T_a$ is set to a first sum of: said $T_{dp}$ and a second temperature constant of 3 degrees Celsius if said $T_{dp}$ is greater or equal to said threshold temperature.

6. The system of claim 1, wherein said $T_b$ is equal to a second sum of: said $T_{ci}$, a product of 0.000032 and said $P_{rack}$, and a third temperature constant of 1.4 degrees Celsius.

7. The system claim 1, wherein said controller is further configured to reduce a number of revolutions per minute (RPMs) of a liquid inlet pump of said MCU in response to a reduction in said $T_{sp}$.

8. A computer program product for controlling liquid-cooled electronics, the program product comprising:
   a tangible computer-readable storage device; and
   program instructions stored on said computer-readable storage device that when executed on a processing system, cause the processing system to:
   determine a first set point temperature, $T_a$, wherein said $T_a$ is based on a dew point temperature, $T_{dp}$ of a computer room;
   determine a second set point temperature, $T_b$, wherein said $T_b$ is based on a facility chilled liquid inlet temperature, $T_{ci}$, and a rack power, $P_{rack}$, of an electronics rack that includes at least one heat-generating electronics subsystem;
   select a Modular Cooling Unit (MCU) set point temperature, $T_{sp}$, for at least one MCU associated with said electronics rack such that power efficiency of a system that includes said MCU and said electronics rack is increased while ensuring that said $T_{sp}$ does not fall below said $T_{dp}$, wherein said $T_{sp}$ is selected to be the higher value of said $T_a$ and said $T_b$; and regulate a control valve that controls a flow of system coolant that passes through a liquid-to-liquid heat exchanger of said MCU responsive to said selected $T_{sp}$, wherein said MCU has an associated air-to-liquid heat exchanger and the processing system is further configured to, in response to determining that a temperature of the system coolant is out of specification, control an isolation valve to shut off the flow of the system coolant to the air-to-liquid heat exchanger.

9. The computer program product of claim 8, wherein the program instructions stored on said computer-readable device that when executed on a processing system, cause the processing system to further select a default value of said $T_{sp}$, in response to determining said $T_a$ and said $T_b$ are not rationalized.

10. The computer program product of claim 9, wherein the program instructions stored on said computer-readable device that when executed on a processing system, cause the processing system to further select said default value for $T_a$ in response to determining said $T_{dp}$ is not rationalized.

11. The computer program product of claim 9, wherein the program instructions stored on said computer-readable device that when executed on a processing system, cause the processing system to further select said default value for $T_b$ in response to determining said $T_{ci}$ is not rationalized.

12. The computer program product of claim 8, wherein said $T_a$ is set to a first temperature constant of 15 degrees Celsius if $T_{dp}$ is less than a threshold temperature of 12 degrees Celsius, and wherein said $T_a$ is set to a first sum of: said $T_{dp}$ and a second temperature constant of 3 degrees Celsius if said $T_{dp}$ is greater or equal to said threshold temperature.

13. The computer program product of claim 8, wherein said $T_b$ is equal to a second sum of: said $T_{ci}$, a product of 0.000032 and said $P_{rack}$, and a third temperature constant of 1.4 degrees Celsius.

* * * * *